(12) United States Patent
Zeller et al.

(10) Patent No.: US 12,465,238 B2
(45) Date of Patent: Nov. 11, 2025

(54) PROVIDING AN INDICATION REGARDING THE AFFLICTION OF A PATIENT WITH AN INFECTIOUS RESPIRATORY DISEASE BASED ON MAGNETIC RESONANCE IMAGING DATA

(71) Applicant: Siemens Healthcare GmbH, Erlangen (DE)

(72) Inventors: Mario Zeller, Erlangen (DE); David Grodzki, Erlangen (DE); Thomas Benkert, Neunkirchen Am Brand (DE)

(73) Assignee: Siemens Healthineers AG, Forchheim (DE)

( * ) Notice: Subject to any disclaimer, the term of this patent is extended or adjusted under 35 U.S.C. 154(b) by 449 days.

(21) Appl. No.: 17/921,413

(22) PCT Filed: Apr. 8, 2021

(86) PCT No.: PCT/EP2021/059176
§ 371 (c)(1),
(2) Date: Oct. 26, 2022

(87) PCT Pub. No.: WO2021/219338
PCT Pub. Date: Nov. 4, 2021

(65) Prior Publication Data
US 2023/0157571 A1 May 25, 2023

Related U.S. Application Data

(60) Provisional application No. 63/017,083, filed on Apr. 29, 2020.

(51) Int. Cl.
G06T 7/10 (2017.01)
A61B 5/00 (2006.01)
(Continued)

(52) U.S. Cl.
CPC ............... *A61B 5/08* (2013.01); *A61B 5/004* (2013.01); *A61B 5/055* (2013.01); *A61B 5/4842* (2013.01);
(Continued)

(58) Field of Classification Search
CPC ........... A61B 5/08; A61B 5/004; A61B 5/055; A61B 5/4842; A61B 5/7267; A61B 5/743;
(Continued)

(56) References Cited

U.S. PATENT DOCUMENTS

2020/0085382 A1 3/2020 Taerum et al.
2021/0042916 A1 2/2021 Zhang et al.

FOREIGN PATENT DOCUMENTS

AU 2021100026 A4 3/2021
WO WO 2019157214 A2 8/2019
WO WO 2021219338 A1 11/2021

OTHER PUBLICATIONS

Bauman et al.; Pulmonary Functional Imaging: Qualitative Comparison of Fourier Decomposition MR Imaging with SPECT/CT in Porcine Lung; Radiology; vol. 260, No. 2; p. 551-559; published online Aug. 1, 2011 (Year: 2011).*

(Continued)

Primary Examiner — Chao Sheng
(74) Attorney, Agent, or Firm — Harness, Dickey & Pierce, P.L.C.

(57) ABSTRACT

A computer-implemented method for providing output data comprising an indication regarding the affliction of a patient with an infectious respiratory disease, the method comprises receiving magnetic resonance imaging data, the magnetic resonance imaging data acquired using a magnetic resonance imaging system, the magnetic resonance imaging data comprising a lung region of the patient; applying a trained (Continued)

function to the magnetic resonance imaging data to generate the output data, the trained function being based on an artificial neural network and the output data comprising the indication regarding the affliction of the patience with the infectious respiratory disease; and proving the output data.

42 Claims, 5 Drawing Sheets

(51) Int. Cl.
  *A61B 5/01* (2006.01)
  *A61B 5/055* (2006.01)
  *A61B 5/08* (2006.01)
  *G01R 33/56* (2006.01)
  *G01R 33/563* (2006.01)
  *G16H 30/40* (2018.01)
  *G16H 50/20* (2018.01)

(52) U.S. Cl.
  CPC ............ *A61B 5/7267* (2013.01); *A61B 5/743* (2013.01); *G01R 33/5608* (2013.01); *G01R 33/56366* (2013.01); *G06T 7/10* (2017.01); *G16H 30/40* (2018.01); *G16H 50/20* (2018.01); *A61B 5/015* (2013.01); *G06T 2207/10088* (2013.01); *G06T 2207/30061* (2013.01)

(58) Field of Classification Search
  CPC . A61B 5/015; G06T 7/10; G06T 2207/10088; G06T 2207/30061; G16H 50/20; G16H 30/40; G01R 33/5605; G01R 33/56366
  See application file for complete search history.

(56) References Cited

OTHER PUBLICATIONS

Both et al.; Fast T1- and T2-weighted pulmonary MR-imaging in patients with bronchial carcinoma; European Journal of Radiology vol. 53, Issue 3, Mar. 2005, pp. 478-488; Published online Jul. 15, 2004 (Year: 2004).*

Dournes et al.; Lung MRI in Parenchymal Disease; Magnetom Flash (74) Mar. 2019; p. 52-57 (Year: 2019).*

Agnes et al.; Automatic 2D Lung Nodule Patch Classification using Deep Neural Networks; 2020 Fourth International Conference on Inventive Systems and Control (ICISC); Date of Conference: Jan. 8-10, 2020; p. 500-504 (Year: 2020).*

Li et al.; Using Artificial Intelligence to Detect COVID-19 and Community-acquired Pneumonia Based on Pulmonary CT: Evaluation of the Diagnostic Accuracy; Radiology; vol. 296, No. 2; p. 65-72; Published Online Mar. 19, 2020 (Year: 2020).*

Salehi, Sana et al. "Long-term Pulmonary Consequences of Coronavirus Disease 2019 (COVID-19)" Journal of Thoracic Imaging, vol. 35, No. 4, pp. W87-W89, Jul. 2020 // doi: 10.1097/RTI.0000000000000534.

Langenbach, C. Marcel et al: "MRI appearance of COVID-19 infection", Diagnostic and Interventional Radiology; vol. 26; No. 4; Apr. 13, 2020 (Apr. 13, 2020); pp. 377-378; XP055817932.

Gozes et al. "Rapid AI development cycle for the coronavirus (COVID-19) pandemic: Initial results for automated detection & patient monitoring using deep learning CT image analysis", arXiv preprint arXiv:2003.05037, 2020, 20 pgs.; 2020.

Biraja, Ghoshal et al: "Estimating Uncertainty and Interpretability in Deep Learning for Coronavirus (COVID-19) Detection"; arxiv.org, Cornell University Library, 201 Olin Library Cornell University Ithaca, NY 14853; Mar. 22, 2020 (Mar. 22, 2020); XP081627984.

Covid-19-classifier https://labs.deep-insights.ai Stand Oct. 15, 2020.

"A role for COVID-19? What data really tell us so far" publisehd Mar. 30, 2020, www.thelancet.com, vol. 395, Apr. 11, 2020.

Campbell-Washburn, Adrienne et al: "Opportunities in Interventional and Diagnostic Imaging by Using High-Performance Low-Field-Strength MRI", Radiology; vol. 293; No. 2; Nov. 1, 2019 (Nov. 1, 2019); pp. 384-393; XP055818849.

Voskrebenzev, Andreas et al: "Proton MRI of the Lung: How to Tarne Scarce Protons and Fast Signal Decay"; Journal of Magnetic Resonance Imaging; vol. 53; No. 5; Mar. 12, 2020 (Mar. 12, 2020); pp. 1344-1357; XP055818857.

Diagnosing COVID-19 using AI-based medical image analysis Mar. 20, 2020 https://www.qantib.com/blog/diagnosing-covid-19-using-ai-based-medical-image-analysis Stand: Oct. 15, 2020.

Dong, Di et al: "The Role of Imaging in the Detection and Management of COVID-19: A Review"; IEEE Reviews in Biomedical Engineering, IEEE, USA; vol. 14; Apr. 27, 2020 (Apr. 27, 2020); pp. 16-29; XP011832953.

Greenspan H. et al: "Rapid AI Development Cycle for the Coronavirus (COVID-19) Pandemic: Initial Results for Automated Detection & Patient Monitoring using Deep Learning CT Image Analysis", Mar. 2020, arXiv2003.05037.

Voskrebenzev, Andreas et al. "Feasibility of quantitative regional ventilation and perfusion mapping with phase-resolved functional lung (PREFUL) MRI in healthy volunteers and COPD, CTEPH, and CF patients" Magnetic Resonance in Medicine, vol. 79, No. 4, pp. 2306-2314, Apr. 2018 (First published: Aug. 30, 2017) // https://doi.org/10.1002/mrm.26893.

Poyiadji et al; COVID-19-assiciated Acute Hemorrhagic Necrotizing Encephalopathy: Imaging Features https://pubs.rsna.org/doi/10.1148/radiol.2020201187 Stand: Oct. 15, 2020.

Brandon K. et al.: "Imaging of COVID-19: CT, MRI, and PET", Semin. Nucl. med. Nov. 30, 2020, https://doi.org/10.1053/j.semnuclmed.2020.11.003.

Methodology https://labs.deep-insights.ai/methodology.html Stand Oct. 15, 2020.

* cited by examiner

PROVIDING AN INDICATION REGARDING THE AFFLICTION OF A PATIENT WITH AN INFECTIOUS RESPIRATORY DISEASE BASED ON MAGNETIC RESONANCE IMAGING DATA

CROSS-REFERENCE TO RELATED APPLICATION(S)

This application is the National Phase under 35 U.S.C. § 371 of PCT International Application No. PCT/EP2021/059176, which has an international filing date of Apr. 8, 2021, which claims priority under 35 U.S.C. § 120/121 to U.S. Application No. 63/017,083, filed Apr. 29, 2020, the entire contents of each of which are incorporated herein by reference.

FIELD

Embodiments of the invention generally relate to a computer-implemented method for providing output data comprising an indication regarding the affliction of a patient with an infectious respiratory disease, a computer-implemented method for providing a trained function, a providing system, a training system, a computer program and a computer-readable medium.

STATE OF THE ART

In a magnetic resonance imaging system, also called a magnetic resonance tomography system, the body to be examined of an object to be examined, for example a patient, a healthy training volunteer or a phantom, is exposed to a relatively high basic magnetic field with the use of a basic field magnet, for example 1.5 or 3 or 7 tesla. In addition, gradient pulses are activated with the use of a gradient coil arrangement. A radio-frequency antenna arrangement emits radio-frequency pulses, for example excitation pulses, from suitable antennas that cause the nuclear spins of specific atoms excited to resonance by these radio-frequency pulses to be tilted by a defined flip angle relative to the magnetic field lines of the basic magnetic field. Upon relaxation of the nuclear spins, radio-frequency signals, known as magnetic resonance signals, are emitted, received by suitable radio-frequency antennas and then processed further. Finally, the desired image data can be reconstructed from the raw data acquired in this manner.

An infectious respiratory disease is caused by a germ, i.e. a virus, bacterium or other pathogenic microbe which can infect the respiratory system, i.e. the lung, throat, airways of a patient. Such infectious respiratory disease can often be spread through mucus and saliva (also known as "respiratory secretions") which are expelled when a person coughs, sneezes, talks or laughs.

One recent example for an infectious respiratory disease is COVID-19 (coronavirus disease 2019). COVID-19 is caused by the severe-acute respiratory symptom coronavirus 2 (SARS-Cov2). Common symptoms of COVID-19 include fever, cough, and difficulty breathing. In severe cases, COVID-19 can cause pneumonia, severe acute respiratory syndrome, and multiple organ failure. In the majority of cases, patients infected with COVID-19 experience mild to moderate symptoms that do not require hospitalization. However, COVID-19 is fatal to a significant percentage of infected patients. Due to the high reproduction number (R0) and the infectious nature of COVID-19, tools for rapid testing and evaluation are important to track and mitigate its spread.

In the current clinical practice, COVID-19 is diagnosed via RT-PCR (reverse transcription polymerase chain reaction). The sensitivity of such diagnosis tool is currently under discussion. Furthermore, limited availability of RT-PCR test kits has contributed to the undetected spread of COVID-19.

Recent studies show, that an accurate diagnosis can be performed also based on computed tomography (CT) and chest X-ray including the use of a deep learning image analysis algorithm, see Gozes et al. "Rapid AI Development Cycle for the Coronavirus (COVID-19) Pandemic: Initial Results for Automated Detection & Patient Monitoring using Deep Learning CT Image Analysis", 2020, arXiv: 2003.05037. One drawback of this method is the radiation exposure which imposes an additional burden on the patient and might prevent the acquisition of large amounts of training data required to train the deep learning image analysis algorithm.

The article "Long-term pulmonary consequences of Coronavirus Disease 2019 (COVID-19)" of Salehi et al, (Thorac Imaging, Volume 35, Number 4, July 2020) suggests that even after recovery from infectious lung diseases, such as COVID-19 or SARS, long-term functional impairment of the patient can remain. Measuring the sequential recovery of such patients, in particular of the lung of such patients, in longitudinal follow-up imaging studies is of high clinical value. Radiation exposure caused by CT and chest X-ray imaging might be problematic when performing such longitudinal follow-up imaging studies.

SUMMARY

The assessment of functional parameters of the lung can also be performed using non-invasive pulmonary functions tests (PFTs), such as spirometry or plethysmography, without applying ionizing radiation to the patient. A drawback of these noninvasive methods is that the information obtained by PFTs is usually not spatially resolved. Therefore, only a global measure of lung function can be derived from PFTs. Spatially-resolved functional parameters of the lung, e.g. ventilation and/or perfusion parameters, can also be obtained based on scintigraphy imaging employing suitable isotopes. This method, however, includes the necessity to employ radioactive materials and leads to long scanning times.

One or more example embodiments of the present invention enable the provision of output data comprising an indication regarding the affliction of a patient with an infectious respiratory disease in an effective and radiation-dose efficient way.

BRIEF DESCRIPTION OF THE DRAWINGS

The invention will be described and explained in greater detail below on the basis of the example embodiments shown in the figures.

DETAILED DESCRIPTION

Figure 1:
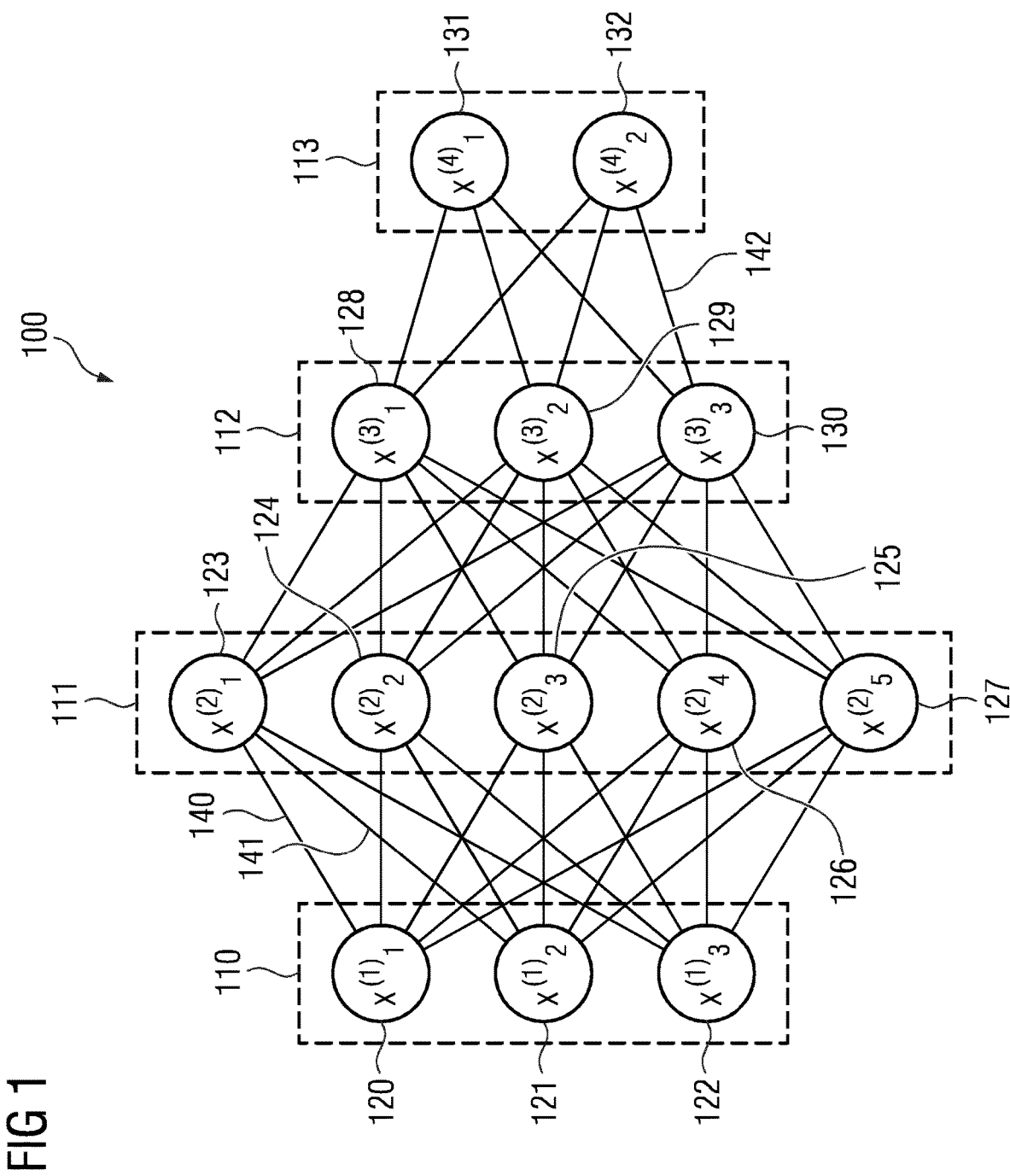
FIG. 1 shows an embodiment of an artificial neural network which can be used as the trained function.

The inventive computer-implemented method of at least one embodiment, for providing output data comprising an indication regarding the affliction of a patient with an infectious respiratory disease, comprises:
receiving magnetic resonance imaging data acquired using a magnetic resonance imaging system, wherein the magnetic resonance imaging data comprise a lung region of the patient,
applying a trained function to the magnetic resonance imaging data, wherein output data are generated,
wherein the trained function is based on an artificial neural network and the output data comprise the indication regarding the affliction of the patient with the infectious respiratory disease,
providing the output data.

The receiving of the magnetic resonance imaging data can comprise acquisition of the magnetic resonance imaging data via the magnetic resonance imaging system or loading of already acquired magnetic resonance imaging data from an image database. The magnetic resonance imaging data comprising a lung region of the patient particularly means that the magnetic resonance imaging data show or image the lung region of the patient. In particular, at least one part of the magnetic resonance shows at least a part of the lung region of the patient. The lung region, also called pulmonary region, typically comprises the right lung and/or the left lung of the patient. Furthermore, the lung region typically comprises bronchioles and alveoli of the patient. The lung region can also comprise at least a part of the diaphragm and/or trachea and/or pleura of the patient. The magnetic resonance imaging data typically comprise reconstructed data comprise a spatial distribution of magnetic resonance signal values and/or of magnetic resonance quantitative values (e.g. T1-maps and/or T2-maps) and/or of magnetic resonance functional data. The magnetic resonance imaging data can also comprise k-space data representing spatial magnetic resonance frequencies before reconstruction.

The received magnetic resonance imaging data can be passed to the trained function so that the output data are generated. Therefore, the magnetic resonance imaging data form the input for the trained function, wherein the output data form the output of the trained function.

In general, the trained function mimics cognitive functions that humans associate with other human minds. In particular, by training based on training data the trained function is able to adapt to new circumstances and to detect and extrapolate patterns.

In general, parameters of the trained function can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In this way, the provision of the output data is based on a machine learning method, also called a deep learning method, which is based on the artificial neural network. An artificial neural network (ANN) is in particular a network of artificial neurons emulated in a computer program.

In particular, the artificial neural network can be a deep neural network, a convolutional neural network or a convolutional deep neural network. Furthermore, a neural network can be an adversarial network, a deep adversarial network and/or a generative adversarial network.

The artificial neural network in this case is typically based on a networking of a number of artificial neurons. The artificial neurons in this case are typically arranged in different layers. Usually the artificial neural network comprises an input layer and an output layer, of which the neuron output is visible as the only output of the artificial neural network. Layers lying between the input layer and the output layer are typically referred to as hidden layers.

Typically, an architecture and/or topology of an artificial neural network is first initiated and then trained in a training phase for a specific task or for a number of tasks. The training of the artificial neural network in such cases typically comprises a change in a weighting of a connection between two artificial neurons of the artificial neural network. The training of the artificial neural network can also comprise a development of new connections between artificial neurons, a deletion of existing connections between artificial neurons, an adaptation of threshold values of the artificial neurons and/or an insertion or a deletion of artificial neurons.

The artificial neural network has in particular already been suitably trained in advance for the provision of the output data. Medical training data records have been used in particular in this case for the training of the artificial neural network. The medical training data records in this case have typically been acquired from training examination objects different from the examination object.

Specifically, the magnetic resonance imaging data can be passed to an input layer, in particular the neurons/nodes of the input layer, of the artificial neural network. The output layer, in particular the at least one node of the output layer, of the artificial neural network can comprise the output data, i.e. the indication regarding the affliction of the patient with the infectious respiratory disease.

In particular, the trained function may be trained in a way to base the indication regarding the affliction of the patient with the infectious respiratory disease on abnormalities detected in the magnetic resonance imaging data. Therefore, the trained function may be specifically trained in order to detect such abnormalities. In case of the infectious respiratory disease being COVID-19, such abnormalities to be detected by the trained function may include at least one of the following abnormalities in the magnetic resonance data associated with COVID-19 (according to the studies of Fields et. al, "Imaging of COVID-19: CT, MRI, and PET", Semin Nucl Med. 2020 Nov. 30, https://doi.org/10.1053/j.semnuclmed.2020.11.003 and Langenbach et al. "MRI appearance of COVID-19 infection", Diagn Interv Radiol 2020; 26:377-378):
ground glass opacities (GGOs),
edema signs,
focal lung infiltrations,
hyperintense consolidations on T2-weighted images,
pseudocavities,
crazy paving patterns
pleural effusions.

Therefore, the trained function can be trained by using training magnetic resonance imaging data which comprise such abnormalities indicating the affliction with the infectious respiratory disease.

The providing of the output data comprises in particular an output of the indication regarding the affliction of the patient with the infectious respiratory disease on an output unit, for example a display unit. As an alternative or in addition, the providing of the output data can comprise a storage of the indication regarding the affliction of the patient with the infectious respiratory disease in a database. As an alternative or in addition, the output data can be transferred to a further processing unit, which, on the basis of the indication regarding the affliction of the patient with the infectious respiratory disease, can carry out further processing of the output data.

The infectious respiratory disease can be any infectious respiratory disease which can be identified on magnetic resonance images. E.g. the infectious respiratory disease can be at least one disease selected from the following group: middle east respiratory syndrome (MERS), severe acute respiratory syndrome (SARS), pneumonia, coronavirus disease 2019 (COVID-19), Tuberculosis. Of course, one can consider further infectious respiratory diseases regarding the inventive method which are not mentioned in this list.

The indication regarding the affliction of the patient with the infectious respiratory disease can comprise a binary classifier which indicated that the patient is afflicted with the respiratory disease or not. Alternatively, the indication regarding the affliction of the patient with the infectious respiratory disease can comprise a value indicating a probability that the patient is afflicted with the respiratory disease. As an alternative or in addition, the indication regarding the affliction of the patient with the infectious respiratory disease can comprise a value indicating an assessment of the severity of the infectious respiratory disease which has afflicted the patient. The output data can comprise the indication whether the patient is afflicted with a certain, single infectious respiratory disease. Alternatively, the output data can differentiate between different infectious respiratory diseases and a healthy patient. The indication regarding the affliction of the patient with the infectious respiratory disease can also just comprise a hint and/or warning message for a physician that the physician should have a closer look at the acquired magnetic resonance imaging data regarding signs for a possible infection of the patient with an infectious respiratory disease.

It is also possible that output data form intermediate data, which are further processed in order to determine the indication regarding the affliction of the patient with the infectious respiratory disease. E.g. the intermediate data can comprise a segmentation of the magnetic resonance imaging data with regard to regions comprising typical abnormalities indicating the affliction of the patient with the infectious respiratory disease. The intermediate data can then be further processed, e.g. by measuring the size of the segmented area, to determine the indication regarding the affliction of the patient with the infectious respiratory disease. In this case, the output data are only provided to a processing application, which performs the further processing of the output data. The affliction of the patient with the infectious respiratory disease, which is determined based on the further processing of the output data, can then be provided, e.g. to an output unit, for example a display unit According to one embodiment of the inventive method the magnetic resonance imaging system has a main magnetic field strength of less than 1.0 Tesla. According to one embodiment of the inventive method the magnetic resonance imaging system has a main magnetic field strength of less than 0.7 Tesla. According to one embodiment of the inventive method the magnetic resonance imaging system has a main magnetic field strength between 0.5 Tesla and 0.6 Tesla.

Generally, magnetic resonance imaging s stems with such main magnetic field strength can be regarded as low-field magnetic resonance imaging systems. Employing a low-field magnetic resonance imaging system for acquiring the magnetic resonance imaging data of the lung can be particularly advantageous. Due to the usage of the low main magnetic field strength, distortions in the magnetic resonance images of the lung are reduced. Furthermore, altered relaxation times and reduced signal dephasing due to employing the low-field magnetic resonance imaging system can lead to higher quality magnetic resonance images of the lung. These effects have already been described by Campbell-Washburn et al., "Opportunities in Interventional and Diagnostic Imaging by Using High-Performance Low-Field-Strength MRI", Radiology. 2019 November; 293(2): 384-393. doi: 10.1148/radiol.2019190452. Epub 2019 Oct. 1. All in all, the higher quality magnetic resonance imaging data of the lung acquired with the low-field magnetic resonance imaging system will lead to a more robust classification using the trained function and a more accurate indication regarding the affliction of the patient with the infectious respiratory disease.

According to one embodiment of the inventive method the magnetic resonance imaging system has a system architecture which is dedicated for imaging a chest region of the patient. Such kind of magnetic resonance imaging system can be regarded as a dedicated magnetic resonance imaging system for imaging the lung of the patient. Furthermore, it can be seen as a practitioner magnetic resonance imaging system and/or point-of-care magnetic resonance imaging system. E.g. an open system architecture can be used, which is particularly useful with low main magnetic field strengths of less than 1.0 Tesla. Even ultra-low main magnetic field strengths can be considered. One advantage of using the dedicated magnetic resonance imaging system in this application is that such magnetic resonance imaging systems can be rapidly deployed to sites at which the infectious respiratory disease is currently raging.

According to one embodiment of the inventive method the magnetic resonance imaging data comprise morphological magnetic resonance imaging data acquired using at least one magnetic resonance imaging pulse sequence selected from the following group: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence, a spiral VIBE pulse sequence, a CHASE pulse sequence, a radial TSE pulse sequence.

The HASTE pulse sequence stands for half-Fourier acquisition single-shot turbo spin echo imaging. The HASTE sequence is also known under other names like SS-FSE, SSH-TSE, UFSE, single-shot fast SE, FASE and Super-FASE. HASTE is a single-shot technique. This means that data from all of k-space is obtained after a single 90°-excitation pulse. HASTE images can be T2-weighted, but can also have other signal weightings depending on the echo time used for the acquisition of the magnetic resonance imaging data.

The BLADE pulse sequence is also known under other names like PROPELLER, MultiVane, RADAR and JET. The BLADE sequence comprises sampling of k-space in a rotating fashion using a set of radially directed strips or "blades". Each blade is composed of multiple parallel phase-encoded lines that can be collected using fast spin echo or gradient echo methods.

The Turbo Spin Echo pulse sequence is also known under other names like TSE, Fast spin-echo (FSE) or RARE (rapid acquisition with relaxation enhancement). The Turbo Spin Echo pulse sequence resembles a conventional spin-echo (SE) pulse sequence in that it uses a series of 180°-refocusing pulses after a single 90°-pulse to generate a train of echoes. However, the phase-encoding gradient for each of these echoes is changed so that multiple lines of the k-space can be acquired within a given repetition time.

The True FISP pulse sequence is also known under other names like FIESTA, T2-FFE. It is a steady-state coherent pulse sequence which balanced gradients are used along all three axes.

A pulse sequence measuring a free-induction-decay (FID) can be e.g. an Ultrashort echo time (UTE) pulse sequence, a pointwise-encoding time reduction with radial acquisition (PETRA) pulse sequence or a zero echo time (zTE) pulse sequence. The UTE pulse sequence can generally comprise echo times of 500 μs or shorter. The PETRA pulse sequence is a hybrid method of zero echo time and single-point imaging techniques. The PETRA pulse sequence foresees that the outer k-space is filled with radial half-projections, whereas the center is measured single pointwise on a Cartesian trajectory.

The radial Volumetric Interpolated Breath-hold Examination (VIBE) pulse sequence is a 3D gradient-echo sequence that uses a radial stack-of-stars sampling scheme to acquire the k-space information.

The acronym GRASE stands for "Gradient and Spin Echo". It is a hybrid pulse sequence technique comprising the acquisition of both gradient echos and spin echos.

According to one embodiment of the inventive method the magnetic resonance imaging data comprise magnetic resonance imaging data acquired using at a combination of a T2-weighted HASTE pulse sequence and a T1-weighted Gradient Echo sequence. According to one embodiment of the inventive method the magnetic resonance imaging data comprise magnetic resonance imaging data acquired using at a combination of a spiral or 3D radial Ultra-short echo-time pulse sequence and a T2-weighted or PD-weighted TSE pulse sequence. According to one embodiment of the inventive method the magnetic resonance imaging data comprise magnetic resonance imaging data acquired using a combination of a T2-weighted BLADE pulse sequence and a radial VIBE pulse sequence. Such combinations of magnetic resonance pulse sequences can be particularly useful as they allow acquisition of suitable magnetic resonance imaging data as input for the trained function in a time-efficient way.

According to one embodiment of the inventive method the magnetic resonance imaging data comprise functional magnetic resonance imaging data comprising a lung ventilation map and/or a lung perfusion map. The lung ventilation map and/or lung perfusion map can be acquired using magnetic resonance lung ventilation imaging and/or lung perfusion imaging. Such magnetic resonance lung ventilation imaging and/or lung perfusion imaging can comprise dynamic contrast-enhanced imaging, e.g. including the administration of a paramagnetic contrast agent, such as Gd-DTPA. Magnetic resonance lung ventilation imaging and/or lung perfusion imaging can comprise dynamic contrast enhanced (DCE) imaging. Using magnetic resonance lung ventilation imaging and/or lung perfusion imaging, regions with reduced and increased parenchymal ventilation and/or perfusion can be identified, especially as regions showing reduced and higher contrast enhancement. Non-contrast enhanced methods can be also used for the acquisition of the lung ventilation map and/or lune perfusion map, e.g. a pulmonary perfusion arterial spin labeling (ASL) technique. Such functional magnetic resonance imaging data can allow an accurate classification whether the patient is afflicted with the infectious respiratory disease. Applying the trained function to the lung ventilation map and/or lung perfusion map can allow an accurate generation of the indication regarding the affliction of the patient with the infectious respiratory disease, as infectious respiratory diseases, like e.g. COVID-19, can impair lung function, such as ventilation and/or perfusion. E.g. a ventilation-perfusion mismatch has been found in moderate to severe COVID-19 cases. Areas with potential lung damage (e.g. ventilation and/or perfusion defects) can easily be detected in the lung ventilation map and/or lung perfusion map. Furthermore, it might be beneficial to evaluate the progression of the infectious respiratory disease over time based on lung ventilation maps and/or lung perfusion maps acquired from the same patient at different consecutive time points. E.g. the extent of ventilation and/or perfusion defects can be compared between magnetic resonance data acquired from the same patient in follow-up imaging studies performed in dedicated time intervals. The time development of the damaged lung areas can reveal information on recovery progression.

According to one embodiment of the inventive method the functional magnetic resonance imaging data comprise the lung ventilation map and/or the lung perfusion map acquired based on a Fourier decomposition approach applied on a time series of dynamic magnetic resonance data. Therefore, dynamic magnetic resonance data are acquired from the patient and a Fourier decomposition (FD) is applied to the dynamic magnetic resonance data to estimate the lung ventilation map and/or the lung perfusion map. The time series of dynamic magnetic resonance data can be generated based on a dynamic magnetic resonance imaging scan or can also be generated retrospectively from a free-breathing magnetic resonance imaging scan. Typically, a registration is performed to eliminate respiratory motion from the time series of dynamic magnetic resonance data. Afterwards, a voxel-wise frequency analysis is performed on the registered magnetic resonance data. Thereby, deformations of lung parenchyma and/or pulmonary blood flow can be estimated, which can be used to calculate the lung ventilation map and/or the lung perfusion map. A possible implementation of this method is phase-resolved functional lung (PREFUL) magnetic resonance imaging as suggested by Voskrebenzev et al. for evaluation of non-infectious respiratory diseases like COPD or cystic fibrosis (see Voskrebenzev et al, "Feasibility of quantitative regional ventilation and perfusion mapping with phase-resolved functional lung (PREFUL) MRI in healthy volunteers and COPD, CTEPH, and CF patients", Magnetic Resonance in Medicine, Volume 79, Issue 4, August 2017). Alternatively or additionally, matrix pencil decomposition and/or nonuniform Fourier-decomposition (NUFD) can be used to calculate the lung ventilation map and/or the lung perfusion map. The utilization of the Fourier decomposition approach allows the estimation of the lung ventilation map and/or the lung perfusion map without the necessity to apply a contrast agent to the patient during magnetic resonance imaging.

According to one embodiment of the inventive method the magnetic resonance imaging data comprise a combination of the morphological magnetic resonance imaging data and functional magnetic resonance imaging data comprising a lung ventilation map and/or a lung perfusion map. In particular, the morphological magnetic resonance imaging data and the functional magnetic resonance imaging data can jointly form the input vector of the artificial neural network. Therefore, the provision of the indication regarding the affliction of the patient with the infectious respiratory disease can be based on a larger set of input data. The magnetic resonance imaging data can comprise a combination of the lung ventilation map with at least one magnetic resonance imaging pulse sequence selected from the following group: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence. The magnetic resonance imaging data can comprise a combination of the lung perfusion map with at least one magnetic resonance imaging pulse sequence selected from the following group: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence. The magnetic resonance imaging data can comprise a combination of the lung ventilation map and the lung perfusion map with at least one magnetic resonance imaging pulse sequence selected from the following group: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence.

In all cases, in which a T2-weighted contrast is mentioned, it is also possible to alternative or additionally acquire the magnetic resonance imaging data using a proton-density (PD) contrast. Furthermore, the usage of diffusion weighted imaging (DWI) for the acquisition of the magnetic resonance imaging data can be advantageous, e.g. to be able to identify pulmonary lesions in the acquired magnetic resonance imaging data.

According to one embodiment of the inventive method the magnetic resonance imaging data comprise magnetic resonance fingerprinting data acquired using a magnetic resonance fingerprinting technique. According to one embodiment of the inventive method the magnetic resonance fingerprinting data comprise at least two spatially-resolved maps selected from the following group: T1 map, T2 map, PD-map.

Magnetic resonance fingerprinting is a quantitative magnetic resonance method by means of which quantitative values for tissue parameters of an object under examination and thus tissue parameter maps can be determined. One advantage of magnetic resonance fingerprinting is that a number of tissue parameters, for example a T1 relaxation time and a T2 relaxation time can be simultaneously acquired in an individual measurement. In this manner, magnetic resonance fingerprinting can make it unnecessary to use a number of different capture sequences for acquiring multiple tissue parameters, and so reduce the complexity and/or acquisition time of a magnetic resonance examination.

The magnetic resonance fingerprinting method typically provides the acquisition of a magnetic resonance signal waveform of the voxel by means of a pseudorandomized or non-coherent acquisition scheme, and thereafter a signal comparison of the magnetic resonance signal waveform with a number of database signal waveforms.

The acquired magnetic resonance signal waveform indicates how a signal value of a magnetic resonance signal recorded in the voxel changes during the acquisition of the magnetic resonance signal waveform. In this case the voxel indicates the region from which the magnetic resonance signal waveform is acquired. It is also conceivable for the magnetic resonance signal waveform to be acquired from a region having a coarser resolution than a voxel. In that case, the magnetic resonance signal waveform can be acquired, for example, averaged over a number of voxels. In a typical application case, a number of magnetic resonance signal waveforms are acquired simultaneously from a number of voxels. For this purpose, a number of raw images can be acquired by the magnetic resonance fingerprinting method in a temporal sequence, and the multiple magnetic resonance signal waveforms then can be formed by the individual voxels of the multiple raw images. The temporal resolution of the magnetic resonance signal waveform is in this case determined by the temporal distance between the acquisition of different magnetic resonance signals. In the magnetic resonance fingerprinting method, different scan parameters are set for the acquisition of the different magnetic resonance signals. The scan parameters can be varied in a pseudo-randomized or non-coherent manner. Possible scan parameters that are varied during the acquisition of the magnetic resonance signal waveform are, for example, an echo time, an embodiment and/or number of radio-frequency pulses, an embodiment and/or number of gradient pulses, a diffusion encoding sequence, etc. In this way a magnetic resonance signal waveform that is characteristic of the voxel, referred to as a fingerprint of the voxel, can be acquired by the magnetic resonance fingerprinting method.

The multiple database signal waveforms with which the acquired magnetic resonance signal waveform is compared are in this case stored in a signal waveform database. A different database value of at least one tissue parameter is in this case advantageously assigned to each of the different database signal waveforms. A specific database signal waveform then in each case represents the signal waveform to be expected in the magnetic resonance fingerprinting method when a sample is examined whose material properties correspond to those of the associated database value of the at least one tissue parameter. The database signal waveforms can be determined for example in a calibration measurement and/or can be simulated. The magnetic resonance fingerprinting method then typically provides that one database signal waveform of the number of database signal waveforms is assigned to the acquired magnetic resonance signal waveform on the basis of the result of the signal comparison. The signal comparison can in this case be determining a similarity of the acquired magnetic resonance signal waveform with the multiple database signal waveforms, with that database signal waveform of the multiple database signal waveforms being assigned to the voxel that exhibits the greatest similarity with the magnetic resonance signal waveform. The database value of the at least one tissue parameter belonging to the assigned database signal waveform can then be set as a measured value of the at least one tissue parameter. The measured value of the at least one tissue parameter for the voxel obtained by the magnetic resonance fingerprinting method can then be displayed or stored as the result of the signal comparison. Possible tissue parameters that can be quantified by the magnetic resonance fingerprinting method are: a T1 relaxation time, a T2 relaxation time, a diffusion value (e.g. an apparent diffusion coefficient (ADC)), a magnetization moment, a proton density, a resonant frequency, a concentration of a substance, etc. Further tissue parameters considered beneficial by those skilled in the art are also conceivable. Of course, the quantitative T1-maps and/or T2-maps can also be acquired with conventional T1-mapping and/or T1-mapping techniques.

According to one embodiment of the inventive method the magnetic resonance imaging data comprise contrast-agent based magnetic resonance imaging data acquired by using at least one technique selected from the following group: inhalation of an oxygen-based contrast agent by the patient, administration of a hyperpolarized contrast agent to the patient, administration of a Fluorine-19 contrast agent to the patient. Therefore, a suitable increase of image contrast in the magnetic resonance imaging data can be achieved in order to further enable accurate classification with the trained function whether the patient is afflicted with the infectious respiratory disease. Furthermore, it is possible to measure the lung ventilation map and/or a lung perfusion map based on magnetic resonance data acquired after inhalation of an oxygen-based contrast agent by the patient, administration of a hyperpolarized contrast agent to the patient or administration of a Fluorine-19 contrast agent to the patient.

According to one embodiment of the inventive method the magnetic resonance imaging data comprise magnetic resonance imaging data acquired using exclusively a single T2-weighted or PD-weighted imaging sequence. According to one embodiment of the inventive method the magnetic resonance imaging data comprise magnetic resonance imaging data acquired using exclusively a single spiral or 3D radial Ultra-short echo-time pulse sequence. Magnetic resonance imaging data acquired using exclusively such sequence can comprise enough information so that a classification whether the patient is afflicted with the infectious respiratory disease is possible. Therefore, it is possible to acquire the magnetic resonance imaging data in a very short measurement time.

According to one embodiment of the inventive method the magnetic resonance imaging data are acquired during free breathing of the patient. Suitable techniques, e.g. fast scanning sequences and/or magnetic resonance motion correction techniques, can make the acquisition during free breathing possible. For example, a radial VIBE sequence (StarVIBE) magnetic resonance imaging sequence has been proven to be robust against patient motion and can therefore be used effectively during free breathing acquisitions. Alternatively or additionally, triggering and/or gating techniques can help the acquisition of the magnetic resonance imaging data during free breathing of the patient. Therefore, the magnetic resonance imaging data can be acquired without the patient having to hold the breath during the acquisition of the magnetic resonance imaging data. This can reduce the burden on the patient, especially when the infectious respiratory disease makes it difficult that the patient holds the breath.

According to one embodiment of the inventive method the artificial neural network is a convolutional neural network, in particular a deep convolutional neural network, i.e. an artificial neural network which typically comprises at least one convolutional layer and usually also at least one local or global pooling layer. According to one embodiment of the inventive method the artificial neural network is a recurrent neural network. In particular, a recurrent neural network is an artificial neural network where connections between nodes form a directed graph along a temporal sequence. In particular, a recurrent neural network can be interpreted as directed acyclic graph. Of course, the trained function can also be based on further types of artificial neural networks conceivable to the person skilled in the art.

According to one embodiment of the inventive method the output data comprise an indication whether the patient is afflicted with the infectious respiratory disease. In particular, the indication regarding the affliction of the patient with the infectious respiratory disease can be the indication whether the patient is afflicted with the infectious respiratory disease.

According to one embodiment of the inventive method the infectious respiratory disease is COVID-19 (coronavirus disease 2019).

According to one embodiment of the inventive method the output data comprise a classification if the patient is afflicted with COVID-19 (coronavirus disease 2019) or not. In this case the indication regarding the affliction of the patient with the infectious respiratory disease can be formed by the classification if the patient is afflicted with COVID-19 (coronavirus disease 2019) or not.

According to one embodiment of the inventive method the output data comprise a classification if the patient is afflicted with a disease selected from the following group: pneumonia, MERS, SARS. In this case the indication regarding the affliction of the patient with the infectious respiratory disease can be formed by the classification if the patient is afflicted with a disease selected from the following group or not: pneumonia, MERS, SARS.

According to one embodiment of the inventive method the output data comprise a classification if the patient is afflicted with COVID-19, at least one different infectious respiratory disease or if the patient is healthy. In this case the indication regarding the affliction of the patient with the infectious respiratory disease can be formed by the classification if the patient is afflicted with COVID-19, at least one different infectious respiratory disease or if the patient is healthy. According to one embodiment of the inventive method the at least one different respiratory disease comprises at, least one infectious respiratory disease selected from the following group: pneumonia, MERS, SARS.

According to one embodiment of the inventive method the output data comprise a classification if a patient afflicted with COVID-19 is in an acute COVID-19 stage or has already recovered from COVID-19. In this case the indication regarding the affliction of the patient with the infectious respiratory disease can be formed by the classification if patient afflicted with COVID-19 is in an acute COVID-19 stage or has already recovered from COVID-19.

According to one embodiment of the inventive method the indication regarding the affliction of the patient with the infectious respiratory disease comprises an indication whether the patient is afflicted with post-acute condition following the acute infection with the infectious respiratory disease. To provide an example for such post-acute condition, it is known that an acute infection with COVID-19 can be followed by the long COVID syndrome (also called: long-haul COVID or chronic COVID syndrome) characterized by long-term sequela—persisting after the typical convalescence period of COVID-19. Therefore, the trained function can be designed in a way to detect typical signs of such post-acute condition in the magnetic resonance imaging data. Thereby, long term follow-up examinations of a patient can be suitably assessed using the inventive method.

According to one embodiment of the inventive method the output data comprise spatially-resolved localization data indicating the affliction of the patient with the infectious respiratory disease. Therefore, the indication regarding the affliction of the patient with the infectious respiratory disease can be formed by the spatially-resolved localization data. The trained function can be designed in a way so that it derives from the spatially-resolved magnetic resonance imaging data as an input the spatially-resolved localization data. The spatially-resolved localization data can be formed as a two-dimensional or three-dimensional map, in particular a heat map, providing spatially-resolved values indicating the affliction of the patient with the infectious respiratory disease. The spatially-resolved localization data can have a lower or the same resolution as the magnetic resonance imaging data.

According to one embodiment of the inventive method the localization data comprise an indication at which location in the magnetic resonance imaging data an abnormality is present which indicates that the patient is afflicted with the infectious respiratory disease. In this case, the indication at which location in the magnetic resonance imaging data the abnormality is present forms the spatially-resolved localization data indication the affliction of the patient with the infectious respiratory disease. The indication at which location the abnormality is present can mark a potentially suspicious area in the magnetic resonance imaging data. Therefore, the localization data can guide a radiologist in his assessment of the magnetic resonance data when diagnosing the infectious respiratory disease.

According to one embodiment of the inventive method the localization data comprise a segmentation of at least one region in the magnetic resonance imaging data in which the abnormality is present which indicates that the patient is afflicted with the infectious respiratory disease. Therefore, a quantitative measure indicating the spatial dimensions of the affliction with the infectious respiratory disease can be derived. In case of a longitudinal follow-up study, the size of the corresponding segmented region in which the abnormality is present can be tracked over time. Therefore, the progression of the infectious respiratory disease over time can be indicated easily.

According to one embodiment of the inventive method the localization data comprise a spatially-resolved indication regarding the severity of the affliction of the patient with the infectious respiratory disease at the corresponding spatial locations. In order to create this spatially-resolved indication, the trained function can derive a spatially-resolved map of severity scores based on the magnetic resonance imaging data as an input. Higher tissue degradations caused by the infectious respiratory disease at a specific spatial location can indicate a higher severity of the affliction of the patient with the infectious respiratory disease at the corresponding specific spatial location. Therefore, useful information about the spatial progression of the infectious respiratory disease, e.g. which areas of the lung are most affected by the infectious respiratory disease, can be provided to the radiologist.

According to one embodiment of the inventive method providing the output data comprises displaying the localization data as an overlay over the magnetic resonance imaging data at the corresponding spatial locations. The overlay is advantageously designed as a semi-transparent overlay so that the magnetic resonance imaging data are still visible beneath the localization data. Therefore, the radiologist can easily assess both the morphological magnetic resonance imaging data and the localization data indicating the affliction of the patient with the infectious respiratory disease at one glance.

According to one embodiment of the inventive method the magnetic resonance imaging data form a part of input data which the trained function is applied to in order to generate the output data, wherein the input data additionally comprise further magnetic resonance imaging data comprising at least one further organ region of the patient. According to one embodiment of the inventive method the at least one further organ region comprises at least one body region selected from the following group: a brain region of the patient, a vascular region of the patient, a heart of the patient.

Generally infectious respiratory diseases might not only affect then lung, but also other organs of the patient. For instance, recent studies show that COVID-19 does not only affect the lung, but also other organs such as the brain (see Poyiadji et al., COVID-19-associated Acute Hemorrhagic Necrotizing Encephalopathy: CT and MRI Features, Radiology. 2020 Mar. 31:201187. doi: 10.1148/radiol.2020201187. Therefore, taking into account magnetic resonance images of the further organ regions of the patient can lead to a more accurate classification whether the patient is affected by the infectious respiratory disease or not. This might be profitable e.g. for high-field magnetic resonance imaging where relaxation times in the lung are reduced because of rapid signal dephasing.

According to one embodiment of the inventive method the magnetic resonance imaging data form a part of input data which the trained function is applied to in order to generate the output data, wherein the method comprises receiving temperature mapping data of the patient acquired with the magnetic resonance imaging system, wherein the input data further comprise the temperature mapping data. In this way, an indication if the patient has an increased body temperature or even fever can directly be derived from the magnetic resonance imaging data. Furthermore, the temperature mapping data can indicate a spatial distribution of the body temperature in the patient's body. Such temperature mapping data can form suitable additional input for the trained function in order to generate the indication regarding the affliction of the patient with the infectious respiratory disease.

According to one embodiment of the inventive method the magnetic resonance imaging data form a part of input data which the trained function is applied to in order to generate the output data, wherein the method comprises receiving demographic data of the patient and/or epidemiologic data of the patient, wherein the input data further comprise the demographic data and/or epidemiologic data. The demographic data and/or epidemiologic data can include at least one or a combination of the following parameters of the patient: age, gender, ethnicity, genetic factors, clinical history, history of contact persons of the patient afflicted with the infectious respiratory disease, relevant pre-existing conditions, further risk factors (e.g. smoking status, BMI, . . . ). Such demographic data and/or epidemiologic data can form suitable additional input for the trained function in order to generate the indication regarding the affliction of the patient with the infectious respiratory disease.

The inventive computer-implemented method of at least one embodiment, for providing a trained function suitable for determining an indication regarding the affliction of a patient with an infectious respiratory disease, comprises:
    receiving input training data which comprise training
        magnetic resonance imaging data acquired using at least one magnetic resonance imaging system, wherein the magnetic resonance imaging data comprise lung regions of training subjects, receiving output training data, wherein the output training data are related to the input training data and wherein the output training data comprise an indication regarding the affliction of the training subjects with the infectious respiratory disease, training a function based on the input training data and the output training data in order to generate a trained function, wherein the trained function is based on an artificial neural network, providing the trained function.

According to one embodiment of the method for providing output data comprising an indication regarding the affliction of a patient with the infectious respiratory disease, the trained function is provided by the method for providing a trained function suitable for determining an indication regarding the affliction of a patient with the infectious respiratory disease.

The inventive providing system of at least one embodiment, for providing output data comprising an indication regarding the affliction of a patient with an infectious respiratory disease, comprises:

an input interface, configured for receiving magnetic resonance imaging data acquired using a magnetic resonance imaging system, wherein the magnetic resonance imagine data comprise a lung region of the patient, a computation unit, configured for applying a trained function to the magnetic resonance imaging data, wherein output data are generated, wherein the trained function is based on an artificial neural network and the output data comprise the indication regarding the affliction of the patient with the infectious respiratory disease, an output interface configured for providing the output data.

The solution according to one or more example embodiments of the present invention is generally described with respect to the claimed providing systems as well as with respect to the claimed methods. Features, advantages or alternative embodiments herein can be as caned to the other claimed objects and vice versa. In other words, claims for the providing systems can be improved with features described or claimed in the context of the methods. In this case, the functional features of the method are embodied by objective units of the providing system.

The inventive training system of at least one embodiment, for providing a trained function suitable for determining an indication regarding the affliction of a patient with an infectious respiratory disease, comprises:

an input training data interface, configured for receiving input training data which comprise training magnetic resonance imaging data acquired using at least one magnetic resonance imaging system, wherein the magnetic resonance imaging data comprise lung regions of training subjects, an output training data interface, configured for receiving output training data, wherein the input training data are related to the output training data and wherein the output training data comprise an indication regarding the affliction of the training subjects with the infectious respiratory disease, a training computation unit, configured training a function based on the input training data and the output training data to generate a trained function, wherein the trained function is based on an artificial neural network, an output interface configured for providing the trained function.

At least one embodiment of the inventive computer program comprises instructions which, when the program is executed by a computer, cause the computer system to carry out an embodiment of an inventive method. To do this the computer system must have the preconditions in this case, such as for example a corresponding main memory, a corresponding graphics card or a corresponding logic unit, so that the respective method steps can be carried out efficiently. The computer program, in at least one embodiment, is stored on a computer-readable medium for example or is held on a network or server, from it can be loaded into the processor of a local processing unit, which can be connected directly to it or be part of it. Furthermore, control information of the computer program product can be stored on an electronically-readable data medium. The control information of the electronically-readable data medium can be embodied so as to carry out at least one embodiment of an inventive method when the data medium is used in a processing unit. Thus, the computer program can also represent the electronically-readable data medium.

Furthermore, at least one embodiment of the computer-readable medium comprises instructions which, when executed by a computer, cause the computer to carry out an embodiment of an inventive method. This enables at least one embodiment of the inventive method to be carried out quickly, in an identically repeatable manner and robustly. Examples of electronically-readable data media are a DVD, a magnetic tape, a hard disk or a USB stick, on which electronically-readable control information, in particular software, is stored. When this control information (software) is read from the data medium and stored in a controller and/or processing unit, all inventive forms of embodiments of the method previously described can be carried out.

Furthermore, an inventive computer readable medium according to one embodiment comprises a trained function provided by a method for providing a trained function configured to determining an indication regarding the affliction of a patient with an infectious respiratory disease. Furthermore, an inventive magnetic resonance imaging system comprises an inventive providing system.

In the following, the embodiments presented in the claim section of the US provisional priority application are summarized:

1. A computer-implemented method for providing output data comprising an indication whether a patient is afflicted with an infectious respiratory disease, comprising the following steps:
    receiving magnetic resonance imaging data acquired using a magnetic resonance imaging system, wherein the magnetic resonance imaging data comprise a lung region of the patient,
    applying a trained function to the magnetic resonance imaging data, wherein output data are generated,
    wherein the trained function is based on an artificial neural network and the output data comprise an indication whether the patient is afflicted with the infectious respiratory disease,
    providing the output data.
2. Computer-implemented method according to embodiment 1, wherein the magnetic resonance imaging system has a main magnetic field strength of less than 1.0 Tesla.

3. Computer-implemented method according to embodiment 1, wherein the magnetic resonance imaging system has a main magnetic field strength of less than 0.7 Tesla.
4. Computer-implemented method according to embodiment 1, wherein the magnetic resonance imaging system has a main magnetic field strength between 0.5 Tesla and 0.6 Tesla.
5. Computer-implemented method according to any of the preceding embodiments, wherein the magnetic resonance imaging system has an open system architecture which is dedicated for imaging a chest region of the patient.
6. Computer-implemented method according to any of the preceding embodiments, wherein the magnetic resonance imaging data comprise morphological magnetic resonance imaging data acquired using at least one magnetic resonance imaging pulse sequence selected from the following group: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence.
7. Computer-implemented method according to any of the preceding embodiments, wherein the magnetic resonance imaging data comprise functional magnetic resonance imaging data comprising a lung ventilation map and/or a lung perfusion map.
8. Computer-implemented method according to any of the embodiments 6-7, wherein the magnetic resonance imaging data comprise a combination of the morphological magnetic resonance imaging data and functional magnetic resonance imaging data comprising a lung ventilation map and/or a lung perfusion map.
9. Computer-implemented method according to any of the preceding embodiments, wherein the magnetic resonance imaging data comprise magnetic resonance imaging data acquired using at a combination of a T2-weighted HASTE pulse sequence and a T1-weighted Gradient Echo sequence.
10. Computer-implemented method according to any of the preceding embodiments, wherein the magnetic resonance imaging data comprise magnetic resonance imaging data acquired using at a combination of a spiral Ultra-short echo-time pulse sequence and a T2-weighted TSE pulse sequence.
11. Computer-implemented method according to any of the preceding embodiments, wherein the magnetic resonance imaging data comprise magnetic resonance imaging data acquired using at a combination of a T2-weighted BLADE pulse sequence and a radial VIBE pulse sequence.
12. Computer-implemented method according to any of the preceding embodiments, wherein the magnetic resonance imaging data comprise magnetic resonance fingerprinting data acquired using a magnetic resonance fingerprinting technique.
13. Computer-implemented method according to embodiment 12, wherein the magnetic resonance fingerprinting data comprise at least two spatially-resolved maps selected from the following group: T1 map, T2 map, PD-map.
14. Computer-implemented method according to any of the preceding embodiments, wherein the magnetic resonance imaging data comprise contrast-agent based magnetic resonance imaging data acquired by using at least one technique selected from the following group: inhalation of an oxygen-based contrast agent by the patient, administration of a hyperpolarized contrast agent to the patient, administration of a Fluorine-19 contrast agent to the patient.
15. Computer-implemented method according to any of the embodiments 1 to 5, wherein the magnetic resonance imaging data comprise magnetic resonance imaging data acquired using exclusively a single T2-weighted imaging sequence.
16. Computer-implemented method according to any of the embodiments 1 to 5, wherein the magnetic resonance imaging data comprise magnetic resonance imaging data acquired using exclusively a single spiral Ultra-short echo-time pulse sequence.
17. Computer-implemented method according to any of the preceding embodiments, wherein the magnetic resonance imaging data are acquired during free breathing of the patient.
18. Computer-implemented method according to any of the preceding embodiments, wherein the artificial neural network is a convolutional neural network.
19. Computer-implemented method according to any of the embodiments 1-17, wherein the artificial neural network is a recurrent neural network.
20. Computer-implemented method according to any of the preceding embodiments, wherein the output data comprise a classification if the patient is afflicted with COVID-19 (coronavirus disease 2019) or not.
21. Computer-implemented method according to any of the preceding embodiments, wherein the output data comprise a classification if the patient is healthy or if the patient is afflicted with a disease selected from the following group: pneumonia, MERS, SARS.
22. Computer-implemented method according to any of the preceding embodiments, wherein the output data comprise a classification if the patient is afflicted with COVID-19, at least one different infectious respiratory disease or if the patient is healthy.
23. Computer-implemented method according to embodiment 22, wherein the at least one different respiratory disease comprises at least one infectious respiratory disease selected from the following group: pneumonia, MERS, SARS.
24. Computer-implemented method according to any of the preceding embodiments, wherein the output data comprise a classification if the patient afflicted with COVID-19 is in an acute COVID-19 stage or has already recovered from COVID-19.
25. Computer-implemented method according to any of the preceding embodiments, wherein the output data comprise localization data comprising an indication at which location in the magnetic resonance imaging data an abnormality is present which indicates that the patient is afflicted with the infectious respiratory disease.
26. Computer-implemented method according to embodiment 25, wherein the localization data comprise a segmentation of at least one region in the magnetic resonance imaging data in which the abnormality is present which indicates that the patient is afflicted with the infectious respiratory disease.
27. Computer-implemented method according to any of the preceding embodiments, wherein the magnetic resonance imaging data form a part of input data which the trained function is applied to in order to generate the output data, wherein the input data additionally comprise further magnetic resonance imaging data comprising at least one further organ region of the patient.

28. Computer-implemented method according to embodiment 27, wherein the at least one further organ region comprises at least one body region selected from the following group: a brain region of the patient, a vascular region of the patient, a heart of the patient.

29. Computer-implemented method according to any of the preceding embodiments, wherein the magnetic resonance imaging data form a part of input data which the trained function is applied to in order to generate the output data, wherein the method comprises receiving temperature mapping data of the patient acquired with the magnetic resonance imaging system, wherein the input data further comprise the temperature mapping data.

30. Computer-implemented method according to any of the preceding embodiments, wherein the magnetic resonance imaging data form a part of input data which the trained function is applied to in order to generate the output data, wherein the method comprises receiving demographic data of the patient and/or epidemiologic data of the patient, wherein the input data further comprise the demographic data and/or epidemiologic data.

31. A computer-implemented method for providing a trained function configured to determining an indication whether a patient is afflicted with an infectious respiratory disease, comprising the following steps:
    receiving input training data which comprise training magnetic resonance imaging data acquired using at least one magnetic resonance imaging system, wherein the magnetic resonance imaging data comprise lung regions of training subjects,
    receiving output training data, wherein the output training data are related to the input training data and wherein the output training data comprise an indication whether the training subjects are afflicted with the infectious respiratory disease,
    training a function based on the input training data and the output training data in order to generate a trained function, wherein the trained function is based on an artificial neural network,
    providing the trained function.

32. Computer-implemented method according to any of the embodiments 1-30, wherein the trained function is provided by the computer-implemented method according to embodiment 31.

33. A providing system for providing output data comprising an indication whether a patient is afflicted with an infectious respiratory disease, comprising
    an input interface, configured for receiving magnetic resonance imaging data acquired using a magnetic resonance imaging system, wherein the magnetic resonance imaging data comprise a lung region of the patient,
    a computation unit, configured for applying a trained function to the magnetic resonance imaging data, wherein output data are generated,
    wherein the trained function is based on an artificial neural network and the output data comprise an indication whether the patient is afflicted with the infectious respiratory disease,
    an output interface configured for providing the output data.

34. A training system for providing a trained function suitable for determining an indication whether a patient is afflicted with an infectious respiratory disease, comprising
    an input training data interface, configured for receiving input training data which comprise training magnetic resonance imaging data acquired using at least one magnetic resonance imaging system, wherein the magnetic resonance imaging data comprise lung regions of training subjects,
    an output training data interface, configured for receiving output training data, wherein the input training data are related to the output training data and wherein the output training data comprise an indication whether the training subjects are afflicted with the infectious respiratory disease,
    a training computation unit, configured training a function based on the input training data and the output training data to generate a trained function, wherein the trained function is based on an artificial neural network,
    an output interface configured for providing the trained function.

35. A computer program comprising instructions which, when the program is executed by a computer, cause the computer system to carry out the method of one of the embodiments 1-32.

36. A computer-readable medium comprising instructions which, when executed by a computer, cause the computer to carry out the method of one of the embodiments 1-32.

37. A computer-readable medium comprising a trained function provided by a method according to embodiment 32.

38. A magnetic resonance imaging system comprising a providing system according to embodiment 33.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Specific structural and functional details disclosed herein are merely representative for purposes of describing example embodiments of the present invention. This invention may, however, be embodied in many alternate forms and should not be construed as limited to only the embodiments set forth herein.

FIG. 1 displays an embodiment of an artificial neural network 100. Alternative terms for "artificial neural network" are "neural network", "artificial neural net" or "neural net". The artificial neural network 100 can be used as the trained function and applied to magnetic resonance imaging data in order to generate output data according to an embodiment of the inventive computer-implemented method for providing output data comprising an indication regarding the affliction of a patient with an infectious respiratory disease. The artificial neural network 100 can also be the trained function which is provided by one embodiment of the inventive computer-implemented method for providing a trained function suitable for determining the indication regarding the affliction of the patient with the infectious respiratory disease.

It should be noted that the artificial neural network shown in FIG. 1 is one possible example illustrating an artificial neural network. In a practical example, the number and formation of layers, nodes and edges of the artificial neural network employed in the inventive method will differ from the illustration in FIG. 1. For example, typically the number of input nodes will be higher than the number of input nodes shown in FIG. 1.

The artificial neural network 100 comprises nodes 120, ..., 132 and edges 140, ..., 142, wherein each edge 140, ..., 142 is a directed connection from a first node 120, ..., 132 to a second node 120, ..., 132. In general, the first node 120, ..., 132 and the second node 120, ..., 132 are different nodes 120, ..., 132, it is also possible that the first node 120, ..., 132 and the second node 120, ..., 132 are identical. For example, in FIG. 1 the edge 140 is a directed connection from the node 120 to the node 123, and the edge 142 is a directed connection from the node 130 to the node 132. An edge 140, ..., 142 from a first node 120, ..., 132 to a second node 120, ..., 132 is also denoted as "ingoing edge" for the second node 120, ..., 132 and as "outgoing edge" for the first node 120, ..., 132.

In this embodiment, the nodes 120, ..., 132 of the artificial neural network 100 can be arranged in layers 110, ..., 113, wherein the layers can comprise an intrinsic order introduced by the edges 140, ..., 142 between the nodes 120, ..., 132. In particular, edges 140, ..., 142 can exist only between neighboring layers of nodes. In the displayed embodiment, there is an input layer 110 comprising only nodes 120, ..., 122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120, ..., 122 within the input layer 110 usually relates to the number of input values of the neural network, and the number of nodes 131, 132 within the output layer 113 usually relates to the number of output values of the neural network.

With respect to the processing of the input data according to the inventive computer-implemented method for providing the output data comprising the indication regarding the affliction of the patient with the infectious respiratory disease, the magnetic resonance imaging data can be provided to the input layer 110 of the artificial neural network 100. For example, the nodes 120, ..., 122 of the input layer 110 can comprise at least one of the following items:
- spatially-resolved image values of the magnetic resonance imaging data, in particular of the morphological magnetic resonance imaging data,
- spatially-resolved image values of the functional magnetic resonance imaging data,
- spatially-resolved image values of a combination of the morphological magnetic resonance imaging data and functional magnetic resonance imaging data,
- quantitative values, e.g. T1-values and/or T2-values, in particular spatially-resolved quantitative values, comprised by the magnetic resonance imaging data.

The output layer 113 then comprises the output data, i.e. the indication regarding the affliction of the patient with the infectious respiratory disease.

The output layer 113 may comprise a single output node 131, 132 comprising a binary classification, whether the patient is afflicted with the respiratory disease, e.g. COVID-19, or not. The single output node 131, 132 may also comprise more than one discrete output classification, e.g. a classification if the patient is healthy or if the patient is afflicted with a disease selected from the following group: pneumonia, MERS, SARS. A further possible discrete output classification can be a classification if the patient is afflicted with COVID-19, at least one different infectious respiratory disease or if the patient is healthy, wherein the at least one different respiratory disease can comprise at least one infectious respiratory disease selected from the following group: pneumonia, MERS, SARS. A further possible discrete output classification can be a classification if the patient afflicted with COVID-19 is in an acute COVID-19 stage or has already recovered from COVID-19. Of course, the discrete output classifications may also be distributed over several output nodes 131, 132 each comprising a binary classification. The indication regarding the affliction of the patient with the infectious respiratory disease can also comprise an indication whether the patient is afflicted with post-acute condition following the acute infection with the infectious respiratory disease.

The output layer 113 may also comprise several output nodes 131, 132, in particular corresponding to spatially-resolved localization data indicating the affliction of the patient with the infectious respiratory disease. In this case, the number of such output nodes 131, 132 may be smaller than or equal as the number of nodes 120, ..., 122 of the input layer 110. In this case the localization data can comprise an indication at which location in the magnetic resonance imaging data an abnormality is present which indicates that the patient is afflicted with the infectious respiratory disease. Alternatively or additionally, the localization data comprise a segmentation of at least one region in the magnetic resonance imaging data in which the abnormality is present which indicates that the patient is afflicted with the infectious respiratory disease. Alternatively or additionally, the localization data comprise a spatially-resolved indication regarding the severity of the affliction of the patient with the infectious respiratory disease at the corresponding spatial locations.

Each of such several output nodes 131, 132 can e.g. comprise a binary classification, whether an abnormality is present at the corresponding spatial location which indicates that the patient is afflicted with the infectious respiratory disease. The output nodes 131, 132 can also correspond to a segmentation mask comprising a segmentation of at least one region in the magnetic resonance imaging data in which the abnormality is present which indicates that the patient is afflicted with the infectious respiratory disease. The several output nodes 131, 132 can also have more than one discrete or continuous value comprising a spatially-resolved indication regarding the severity of the affliction of the patient with the infectious respiratory disease at the corresponding spatial locations.

In particular, a (real) number can be assigned as a value to every node 120, ..., 132 of the neural network 100. Here, $x(n)_i$ denotes the value of the i-th node 120, ..., 132 of the n-th layer 110, ..., 113. The values of the nodes 120, ..., 122 of the input layer 110 are equivalent to the input values of the neural network 100, the values of the nodes 131, 132 of the output layer 113 are equivalent to the output value of the neural network 100. Furthermore, each edge 140, ..., 142 can comprise a weight being a real number, in particular, the weight is a real number within the interval $[-1, 1]$ or within the interval $[0, 1]$. Here, $w(m,n)_{i,j}$ denotes the weight of the edge between the i-th node 120, ..., 132 of the m-th layer 110, ..., 113 and the j-th node 120, ..., 132 of the n-th layer 110, ..., 113. Furthermore, the abbreviation w(n)i,j is defined for the weight w(n,n+1)i,j.

In particular, to calculate the output values of the neural network 100, the input values are propagated through the neural network. In particular, the values of the nodes 120, ..., 132 of the (n+1)-th layer 110, ..., 113 can be calculated based on the values of the nodes 120, ..., 132 of the n-th layer 110, ..., 113 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values w(m,n)i,j for the edges, the neural network 100 has to be trained using training data. In particular, training data comprises training input data and training output data (denoted as ti). For a training step, the neural network 100 is applied to the training input data to generate calculated output data. In particular, the training data and the calculated output data comprise a number of values, said number being equal with the number of nodes of the output layer.

With respect to the computer-implemented method for providing a trained function suitable for determining the indication regarding the affliction of the patient with the infectious respiratory disease, the input training data can be formed by training magnetic resonance imaging data acquired using at least one magnetic resonance imaging system, wherein the magnetic resonance imaging data comprise lung regions of training subjects. The training output data can comprise an indication regarding the affliction of the training subjects with an infectious respiratory disease.

In particular, a comparison between the calculated output data and the training data is used to recursively adapt the weights within the neural network 100 (backpropagation algorithm). In particular, the weights are changed according to $$w'^{(n)}_{i,j} = w^{(n)}_{i,j} - \gamma \cdot \delta_j^{(n)} \cdot x_i^{(n)}$$

wherein γ is a learning rate, and the numbers δ(n)j can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on δ(n+1)j, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 113, wherein f' is the first derivative of the activation function, and y(n+1)j is the comparison training value for the j-th node of the output layer 113.

Figure 2:
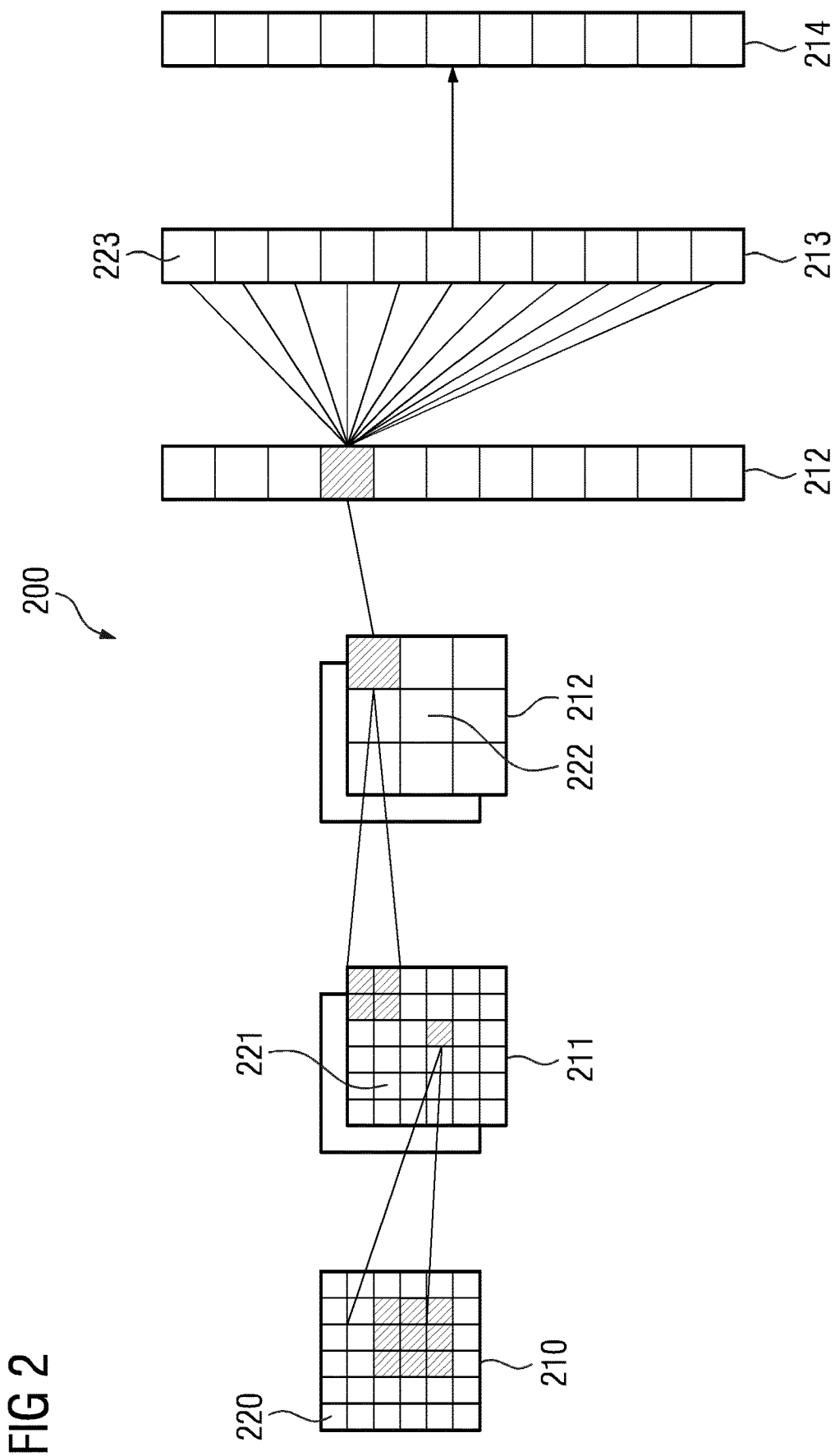
FIG. 2 shows an embodiment of a convolutional neural network which can be used as the trained function.

FIG. 2 displays an embodiment of a convolutional neural network 200. In the displayed embodiment, the convolutional neural network comprises 200 an input layer 210, a convolutional layer 211, a pooling layer 212, a fully connected layer 213 and an output layer 214. Alternatively, the convolutional neural network 200 can comprise several convolutional layers 211, several pooling layers 212 and several fully connected layers 213, as well as other types of layers. The order of the layers can be chosen arbitrarily, usually fully connected layers 213 are used as the last layers before the output layer 214.

It should be noted that the convolutional neural network shown in FIG. 2 is one possible example illustrating a convolutional neural network. In a practical example, the number and formation of layers, nodes and edges of the convolutional neural network employed in the inventive method will differ from the illustration in FIG. 2. For example, typically the output layer will be structured differently than shown in FIG. 2 depending on the type of output desired for the practical application. If e.g. a segmentation of the magnetic resonance imaging data is desired by the convolution neural network, the output layer will be formed by a pixel matrix indicating the segmented magnetic resonance imaging data. In general, the input layer 210 and the output 214 can be formed in the same way as described in FIG. 1 for the neural network.

In particular, within a convolutional neural network 200 the nodes 220, ..., 224 of one layer 210, ..., 214 can be considered to be arranged as a d-dimensional matrix or as a d-dimensional image. In particular, in the two-dimensional case the value of the node 220, ..., 224 indexed with i and j in the n-th layer 210, ..., 214 can be denoted as x(n)[i,j]. However, the arrangement of the nodes 220, ..., 224 of one layer 210, ..., 214 does not have an effect on the calculations executed within the convolutional neural network 200 as such, since these are given solely by the structure and the weights of the edges.

In particular, a convolutional layer 211 is characterized by the structure and the weights of the incoming edges forming a convolution operation based on a certain number of kernels. In particular, the structure and the weights of the incoming edges are chosen such that the values x(n)k of the nodes 221 of the convolutional layer 211 are calculated as a convolution x(n)k=Kk*x(n−1) based on the values x(n−1) of the nodes 220 of the preceding layer 210, where the convolution * is defined in the two-dimensional case as $$x_k^{(n)}[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel Kk is a d-dimensional matrix (in this embodiment a two-dimensional matrix), which is usually small compared to the number of nodes 220, ..., 224 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 220, ..., 224 in the respective layer 210, ..., 214. In particular, for a convolutional layer 211 the number of nodes 221 in the convolutional layer is equivalent to the number of nodes 220 in the preceding layer 210 multiplied with the number of kernels.

If the nodes 220 of the preceding layer 210 are arranged as a d-dimensional matrix, using a plurality of kernels can be interpreted as adding a further dimension (denoted as "depth" dimension), so that the nodes 221 of the convolutional layer 221 are arranged as a (d+1)-dimensional matrix. If the nodes 220 of the preceding layer 210 are already arranged as a (d+1)-dimensional matrix comprising a depth dimension, using a plurality of kernels can be interpreted as expanding along the depth dimension, so that the nodes 221 of the convolutional layer 221 are arranged also as a (d+1)-dimensional matrix, wherein the size of the (d+1)-dimensional matrix with respect to the depth dimension is by a factor of the number of kernels larger than in the preceding layer 210.

The advantage of using convolutional layers 211 is that spatially local correlation of the input data can be exploited by enforcing a local connectivity pattern between nodes of adjacent layers, in particular by each node being connected to only a small region of the nodes of the preceding layer.

In the displayed embodiment, the input layer 210 comprises 36 nodes 220, arranged as a two-dimensional 6×6 matrix. The convolutional layer 211 comprises 72 nodes 221, arranged as two two-dimensional 6×6 matrices, each of the two matrices being the result of a convolution of the values of the input layer with a kernel. Equivalently, the nodes 221 of the convolutional layer 211 can be interpreted as arranges as a three-dimensional 6×6×2 matrix, wherein the last dimension is the depth dimension.

A pooling layer 212 can be characterized by the structure and the weights of the incoming edges and the activation function of its nodes 222 forming a pooling operation based on a non-linear pooling function f. For example, in the two dimensional case the values x(n) of the nodes 222 of the pooling layer 212 can be calculated based on the values x(n−1) of the nodes 221 of the preceding layer 211 as $$x^{(n)}[i,j]=f(x^{(n-1)}[id_1,jd_2], \ldots, x^{(n-1)}[id_1+d_1-1,jd_2+d_2-1])$$

In other words, by using a pooling layer 212 the number of nodes 221, 222 can be reduced, by replacing a number d1·d2 of neighboring nodes 221 in the preceding layer 211 with a single node 222 being calculated as a function of the values of said number of neighboring nodes in the pooling layer. In particular, the pooling function f can be the max-function, the average or the L2-Norm. In particular, for a pooling layer 212 the weights of the incoming edges are fixed and are not modified by training.

The advantage of using a pooling layer 212 is that the number of nodes 221, 222 and the number of parameters is reduced. This leads to the amount of computation in the network being reduced and to a control of overfitting.

In the displayed embodiment, the pooling layer 212 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 213 can be characterized by the fact that a majority, in particular, all edges between nodes 222 of the previous layer 212 and the nodes 223 of the fully-connected layer 213 are present, and wherein the weight of each of the edges can be adjusted individually.

In this embodiment, the nodes 222 of the preceding layer 212 of the fully-connected layer 213 are displayed both as two-dimensional matrices, and additionally as non-related nodes (indicated as a line of nodes, wherein the number of nodes was reduced for a better presentability). In this embodiment, the number of nodes 223 in the fully connected layer 213 is equal to the number of nodes 222 in the preceding layer 212. Alternatively, the number of nodes 222, 223 can differ.

In this embodiment the values of the nodes 224 of the output layer 214 are determined by applying the Softmax function onto the values of the nodes 223 of the preceding layer 213. By applying the Softmax function, the sum the values of all nodes 224 of the output layer is 1, and all values of all nodes 224 of the output layer are real numbers between 0 and 1. In particular, if using the convolutional neural network 200 for categorizing input data, the values of the output layer can be interpreted as the probability of the input data falling into one of the different categories.

A convolutional neural network 200 can also comprise a ReLU (acronym for "rectified linear units") layer. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer. Examples for rectifying functions are f(x)=max(0, x), the tangent hyperbolics function or the sigmoid function.

In particular, convolutional neural networks 200 can be trained based on the backpropagation algorithm. For preventing overfitting, methods of regularization can be used, e.g. dropout of nodes 220, . . . , 224, stochastic pooling, use of artificial data, weight decay based on the L1 or the L2 norm, or max norm constraints.

Figure 3:
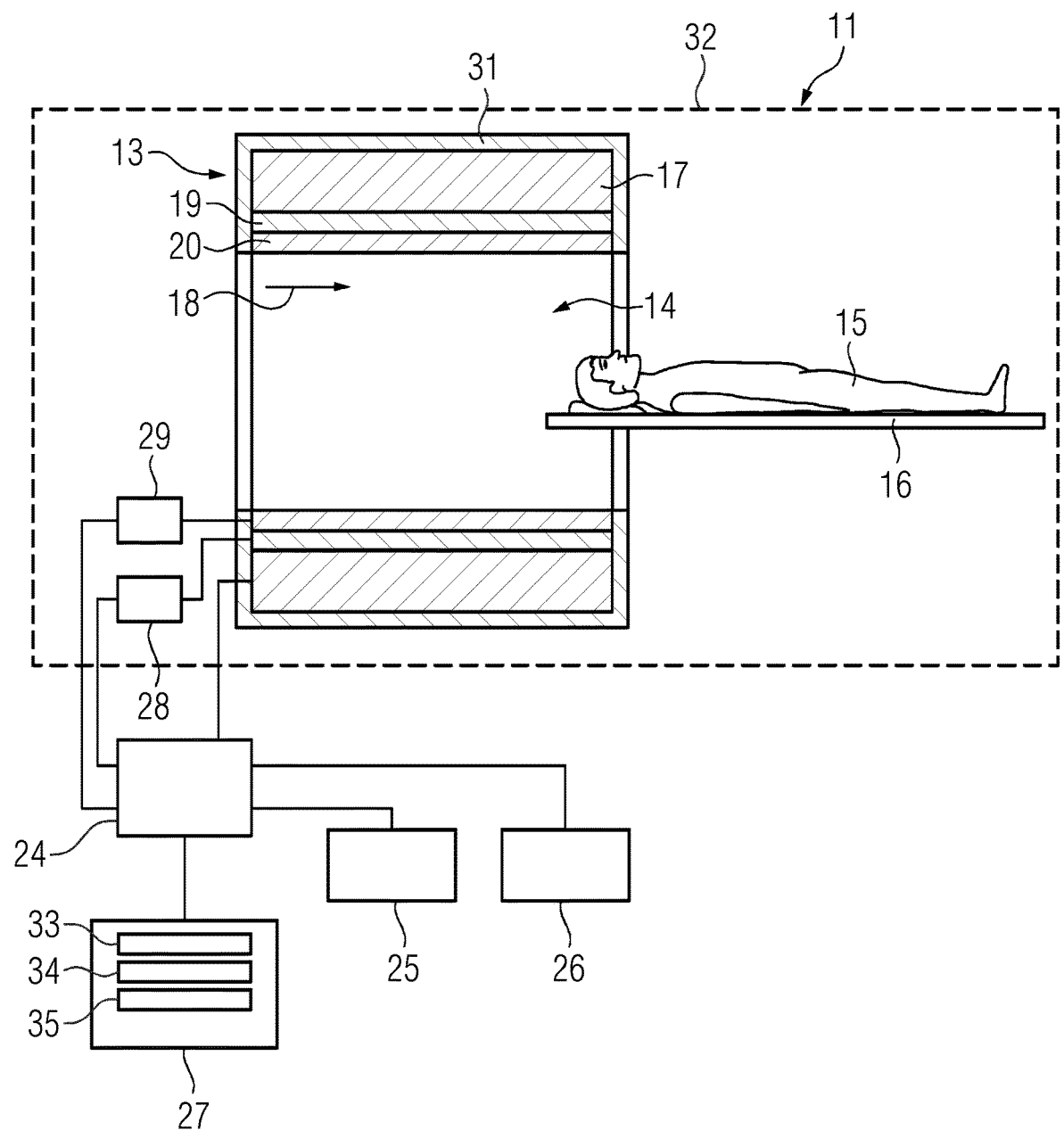
FIG. 3 shows an embodiment of an inventive magnetic resonance imaging system with an inventive providing system.

FIG. 3 shows an embodiment of an inventive magnetic resonance imaging system 11 with an inventive providing system 27.

The magnetic resonance imaging system 11 comprises a detector unit formed by a magnet unit 13 with a main magnet 17 for creating a strong and in particular constant main magnetic field 18. In addition, the magnetic resonance imaging system 11 has a cylinder-shaped patient receiving area 14 for receiving a patient 15, wherein the patient receiving area 14 is surrounded cylindrically in a circumferential direction by the magnetic unit 13. The patient 15 can be pushed via a patient support facility 16 of the magnetic resonance imaging system 11 into the patient receiving area 14. To this end the patient support facility 16 has a table on which the patient lies, which is arranged movably inside the magnetic resonance imaging system 11. The magnet unit 13 is shielded to the outside via housing cladding 31 of the magnetic resonance imaging system.

The magnet unit 13 also has a gradient coil unit 19 for creating magnetic field gradients, which is used for a spatial encoding during an imaging process. The gradient coil unit 19 is controlled via a gradient control unit 28. Furthermore the magnet unit 13 has a radio-frequency antenna unit 20 which, in the case shown, is embodied as a body coil permanently integrated into the magnetic resonance imaging system 10, and a radio-frequency antenna control unit 29 for exciting a polarization, which is produced in the main magnetic field 18 created by the main magnet 17. The radio-frequency antenna unit 20 is controlled by the radio-frequency antenna control unit 29 and irradiates radio-frequency magnetic resonance sequences into the examination space, which is essentially formed by the patient receiving area 14. The radio-frequency antenna unit 20 is furthermore embodied for receiving magnetic resonance signals, in particular from the patient 15.

For controlling the main magnet 17, the gradient control unit 28 and the radio-frequency antenna control unit 29, the magnetic resonance imaging system 11 has a control unit 24. The control unit 24 centrally controls the magnetic resonance imaging system 11, such as for example the carrying out of a predetermined gradient echo sequence. Control information such as for example imaging parameters, as well as reconstructed magnetic resonance images, can be provided on a provision unit 25, in the present case a display unit 25, of the magnetic resonance imaging system 11 for a user. Moreover, the magnetic resonance imaging system 11 has an input unit 26, by which information and/or parameters can be input by the user during a measurement process. The control unit 24 can comprise the gradient control unit 28 and/or radio-frequency antenna control unit. 29 and/or the display unit 25 and/or the input unit 26.

The magnetic resonance imaging system 11 furthermore comprises a recording unit 32. The recording unit 32 is formed in the present case by the magnet unit 13 together with the radio-frequency antenna control unit 29 and the gradient control unit 28.

The magnetic resonance imaging system 11 shown can of course comprise further components that magnetic resonance imaging systems usually have. Moreover, a general way in which a magnetic resonance imaging system 11 functions is known to the person skilled in the art, so that a more detailed description of the further components will be dispensed with here.

FIG. 3 furthermore shows a providing system 27 for providing output data comprising an indication regarding the affliction of a patient with an infectious respiratory disease, which comprises an input interface 33, a computation unit 34 and an output interface 36. In this way the providing system 27 is embodied for carrying out an inventive method, e.g. in accordance with FIGS. 4-5.

For carrying out an embodiment of an inventive method alone, the providing system 27 advantageously load magnetic resonance imaging data via the input interface 33 from a database. When an embodiment of the inventive method is carried out by a combination of the magnetic resonance imaging system 11 and the providing system 27, the input interface 33 of the providing system 27 will in particular receive magnetic resonance imaging data, which have been recorded via the recording unit 32 of the magnetic resonance imaging system 11. For this the providing system 27, in particular the input interface 33, is advantageously connected to the control unit 24 of the magnetic resonance imaging system 11 in respect of an exchange of data. When the inventive method is carried out by a combination of the magnetic resonance imaging system 11 and the providing system 27, the output data can be provided on the provision unit 25 of the magnetic resonance imaging system 11.

Figure 4:
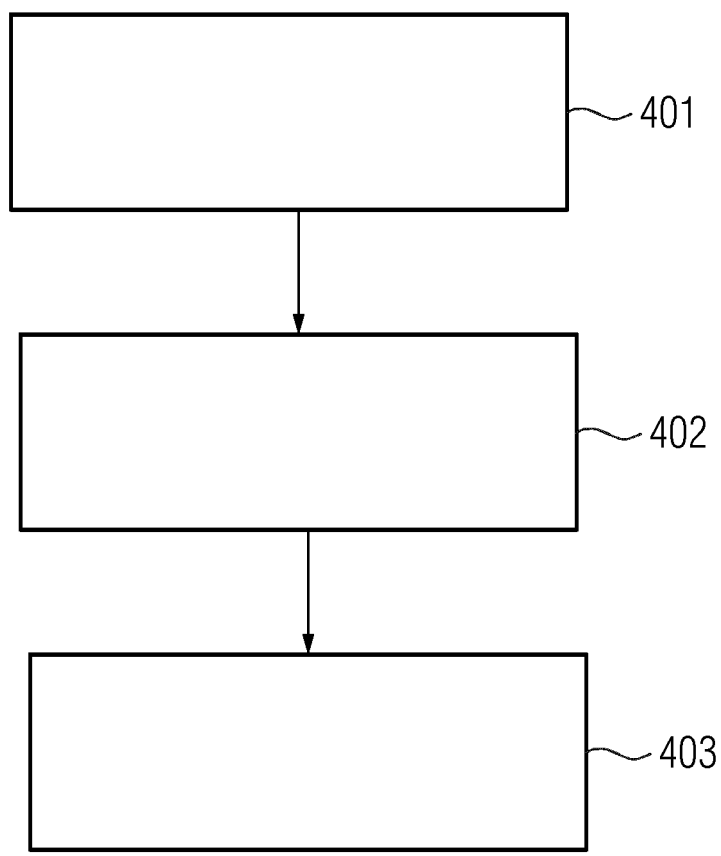
FIG. 4 shows a first embodiment of a computer-implemented method for providing output data comprising an indication regarding the affliction of a patient with an infectious respiratory disease.

FIG. 4 shows a first embodiment of a computer-implemented method for providing output data comprising an indication regarding the affliction of a patient with an infectious respiratory disease.

In a first method step 401 magnetic resonance imaging data acquired using a magnetic resonance imaging system are received, wherein the magnetic resonance imaging data comprise a lung region of the patient.

E.g. the magnetic resonance imaging system can have a main magnetic field strength of less than 1.0 Tesla, less than 0.7 Tesla. or between 0.5 Tesla and 0.6 Tesla. Furthermore, it is possible that the magnetic resonance imaging system has a system architecture which is dedicated for imaging a chest region of the patient.

In a further method step 402 a trained function is applied to the magnetic resonance imaging data, wherein output data are generated, wherein the trained function is based on an artificial neural network and the output data comprise the indication regarding the affliction of the patient with the infectious respiratory disease.

For instance, the artificial neural network is a convolutional neural network or a recurrent neural network.

In a further method step 403 the output data are provided.

Figure 5:
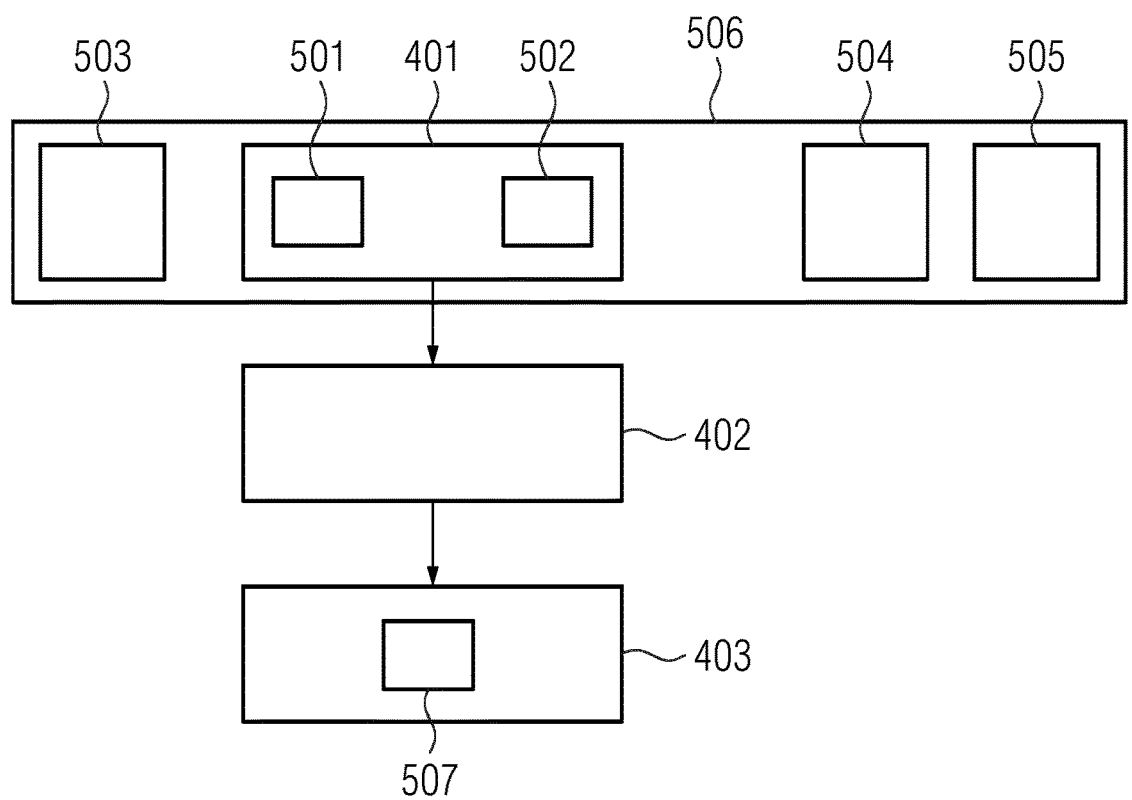
FIG. 5 shows a second embodiment of a computer-implemented method for providing output data comprising an indication regarding the affliction of a patient with an infectious respiratory disease.

FIG. 5 shows a second embodiment of a computer-implemented method for providing output data comprising an indication regarding the affliction of a patient with an infectious respiratory disease.

The description given below is essentially restricted to the differences from the example embodiment in FIG. 4, wherein, as regards method steps that remain the same, the reader is referred to the description of the example embodiment in FIG. 4. Method steps that essentially remain the same are basically labeled with the same reference numbers.

The form of embodiment of the inventive method shown in FIG. 5 essentially contains the method steps 401, 402, 403 of the first form of embodiment of the inventive method in accordance with FIG. 4. In addition, the form of embodiment of the inventive method shown in FIG. 5 comprises additional method steps and substeps. Also conceivable is an alternate execution sequence of the method to FIG. 5, which only has some of the additional method steps and/or substeps shown in FIG. 5. Of course, the alternative execution sequence to FIG. 5 can also have additional method steps and/or substeps.

The receiving of the magnetic resonance imaging data in step 401 comprises the substep 501 in which morphological magnetic resonance imaging data acquired using at least one magnetic resonance imaging pulse sequence selected from the following group are received: a T2-weighted HASTE pulse sequence, a T2-weighted BLADE pulse sequence, a T2-weighted Turbo Spin Echo pulse sequence, a T1-weighted Gradient Echo pulse sequence, a True FISP pulse sequence, a pulse sequence measuring a free-induction-decay (FID), a radial VIBE pulse sequence, a spiral VIBE pulse sequence, a GRASE pulse sequence, a radial TSE pulse sequence.

The receiving of the magnetic resonance imaging data in step 401 comprises the substep 502 in which functional magnetic resonance imaging data comprising a lung ventilation map and/or a lung perfusion map are received. The functional magnetic resonance imaging data can comprise the lung ventilation map and/or the lung perfusion map acquired based on a Fourier decomposition approach applied on a time series of dynamic magnetic resonance data.

In particular, the magnetic resonance imaging data can comprise a combination of the morphological magnetic resonance imaging data and functional magnetic resonance imaging data comprising a lung ventilation map and/or a lung perfusion map.

In particular, the magnetic resonance imaging data can comprise magnetic resonance imaging data acquired using at a combination of a T2-weighted HASTE pulse sequence and a T1-weighted Gradient Echo sequence. In particular, the magnetic resonance imaging data can comprise magnetic resonance imaging data acquired using at a combination of a spiral or 3D radial Ultra-short echo-time pulse sequence and a T2-weighted or PD-weighted TSE pulse sequence. In particular, the magnetic resonance imaging data comprise magnetic resonance imaging data acquired using a combination of a T2-weighted BLADE pulse sequence and a radial VIBE pulse sequence. In particular, the magnetic resonance imaging data can comprise magnetic resonance fingerprinting data acquired using a magnetic resonance fingerprinting technique. In this case, the magnetic resonance fingerprinting data comprise at least two spatially-resolved maps selected from the following group: T1 map, T2 map, PD-map. In particular, the magnetic resonance imaging data can comprise contrast-agent based magnetic resonance imaging data acquired by using at least one technique selected from the following group: inhalation of an oxygen-based contrast agent by the patient, administration of a hyperpolarized contrast agent to the patient, administration of a Fluorine-19 contrast agent to the patient. In particular, the magnetic resonance imaging data can comprise magnetic resonance imaging data acquired using exclusively a single T2-weighted or PD-weighted imaging sequence. In particular, the magnetic resonance imaging data can comprise magnetic resonance imaging data acquired using exclusively a single spiral or 3D radial Ultra-short echo-time pulse sequence. In particular, the magnetic resonance imaging data can be acquired during free breathing of the patient.

As shown in FIG. 5, the input data 506 of the trained function, which the magnetic resonance imaging data form a part of, additionally comprise further magnetic resonance imaging data comprising at least one further organ region of the patient. Such further magnetic resonance imaging data are received in a further step 503. The at least one further organ region can in particular comprise at least one body region selected from the following group: a brain region of the patient, a vascular region of the patient, a heart of the patient.

As shown in FIG. 5, the input data 506 of the trained function, which the magnetic resonance imaging data form a part of, additionally comprise temperature mapping data of the patient acquired with the magnetic resonance imaging system. Such temperature mapping data are received in a further step 504.

As shown in FIG. 5, the input data 506 of the trained function, which the magnetic resonance imaging data form a part of, additionally comprise demographic data of the patient and/or epidemiologic data of the patient. Such demographic data and/or epidemiologic data are received in a further step 505.

According to FIG. 5, the providing of the output data in the further method step 403 comprises the providing of a classification and/or the providing of localization data in a substep 507. The classification can be directed to the patient being afflicted with COVID-19 (coronavirus disease 2019) or not. The classification can also be directed to the patient being healthy or afflicted with a disease selected from the following group: pneumonia, MERS, SARS. The classification can also be directed to the patient being afflicted with COVID-19, at least one different infectious respiratory disease or the patient being healthy. The at least one different respiratory disease can comprise at least one infectious respiratory disease selected from the following group: pneumonia, MERS, SARS. The classification can also be directed to the patient afflicted with COVID-19 being in an acute COVID-19 stage or has already recovered from COVID-19.

The spatially-resolved localization data can indicate the affliction of the patient with the infectious respiratory disease. The localization data can comprise an indication at which location in the magnetic resonance imaging data an abnormality is present which indicates that the patient is afflicted with the infectious respiratory disease. The localization data can furthermore comprise a segmentation of at least one region in the magnetic resonance imaging data in which the abnormality is present which indicates that the patient is afflicted with the infectious respiratory disease. The localization data can comprise a spatially-resolved indication regarding the severity of the affliction of the patient with the infectious respiratory disease at the corresponding spatial locations. The providing of the output data can comprise displaying the localization data as an overlay over the magnetic resonance imaging data at the corresponding spatial locations.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A computer-implemented method for providing output data comprising an indication regarding an affliction of a patient with an infectious respiratory disease, the method comprising:
receiving magnetic resonance imaging data, the magnetic resonance imaging data acquired using a magnetic resonance imaging system, the magnetic resonance imaging data comprising a lung region of the patient;
applying a trained function to the magnetic resonance imaging data to generate the output data, the trained function being based on an artificial neural network and the output data comprising the indication regarding the affliction of the patient with the infectious respiratory disease, the indication regarding the affliction of the patient with the infectious respiratory disease including an indication whether the patient is afflicted with a post-acute condition following an acute infection with the infectious respiratory disease; and
providing the output data.

2. The computer-implemented method of claim 1, wherein the magnetic resonance imaging system has a main magnetic field strength of less than 0.7 Tesla.

3. The computer-implemented method of claim 1, wherein the magnetic resonance imaging system has a main magnetic field strength between 0.5 Tesla and 0.6 Tesla.

4. The computer-implemented method of claim 1, wherein the magnetic resonance imaging system has a system architecture for imaging a chest region of the patient.

5. The computer-implemented method of claim 1, wherein the magnetic resonance imaging data comprise magnetic resonance imaging data acquired using a T2-weighted Single-shot Turbo Spin Echo imaging (HASTE) pulse sequence and a T1-weighted Gradient Echo sequence.

6. The computer-implemented method of claim 1, wherein the magnetic resonance imaging data comprise magnetic resonance imaging data acquired using (i) a spiral or 3D radial Ultra-short echo-time pulse sequence and a T2-weighted, or (ii) proton density (PD)-weighted Turbo Spin Echo (TSE) pulse sequence.

7. The computer-implemented method of claim 1, wherein the magnetic resonance imaging data comprise magnetic resonance imaging data acquired using a T2-weighted BLADE pulse sequence and a radial Volumetric Interpolated Breath-hold Examination (VIBE) pulse sequence.

8. The computer-implemented method of claim 1, wherein the magnetic resonance imaging data comprise contrast-agent based magnetic resonance imaging data acquired using at least one technique, the at least one technique including at least one of an inhalation of an oxygen-based contrast agent by the patient, an administration of a hyperpolarized contrast agent to the patient or an administration of a Fluorine-19 contrast agent to the patient.

9. The computer-implemented method of claim 1, wherein the magnetic resonance imaging data comprise magnetic resonance imaging data acquired using exclusively a single T2-weighted or PD-weighted imaging sequence.

10. The computer-implemented method of claim 1, wherein the magnetic resonance imaging data comprise magnetic resonance imaging data acquired using exclusively a single spiral or 3D radial Ultra-short echo-time pulse sequence.

11. The computer-implemented method of claim 1, wherein the magnetic resonance imaging data comprise magnetic resonance imaging data acquired during free breathing of the patient.

12. The computer-implemented method of claim 1, wherein the artificial neural network is a convolutional neural network.

13. The computer-implemented method of claim 1, wherein the artificial neural network is a recurrent neural network.

14. The computer-implemented method of claim 1, wherein the output data comprise an indication whether the patient is afflicted with the infectious respiratory disease.

15. The computer-implemented method of claim 1, wherein the infectious respiratory disease is COVID-19 (coronavirus disease 2019).

16. The computer-implemented method of claim 1, wherein the output data comprise a classification if the patient is afflicted with COVID-19 (coronavirus disease 2019) or not.

17. The computer-implemented method of claim 1, wherein the output data comprise a classification if the patient is healthy or if the patient is afflicted with a disease, the disease being pneumonia, middle east respiratory syndrome (MERS) or severe acute respiratory syndrome (SARS).

18. The computer-implemented method of claim 1, wherein the output data comprise a classification if the patient afflicted with (coronavirus disease 2019) is in an acute COVID-19 stage or has already recovered from COVID-19.

19. The computer-implemented method of claim 1, wherein the magnetic resonance imaging data form a part of input data which the trained function is applied to generate the output data, wherein the method further comprises:
    receiving temperature mapping data of the patient acquired with the magnetic resonance imaging system, wherein the input data further comprise the temperature mapping data.

20. The computer-implemented method of claim 1, wherein the magnetic resonance imaging data form a part of input data which the trained function is applied to generate the output data, wherein the method further comprises:
    receiving at least one of demographic data of the patient or epidemiologic data of the patient, wherein the input data further comprise the at least one of the demographic data or the epidemiologic data.

21. A non-transitory computer readable medium comprising instructions which, when executed by a computer system, cause the computer system to perform the method of claim 1.

22. The computer-implemented method of claim 1, wherein the magnetic resonance imaging system has a main magnetic field strength of less than 1.0 Tesla.

23. A non-transitory computer-readable medium comprising instructions which, when executed by a computer system, cause the computer system to perform the method of claim 22.

24. The computer-implemented method of claim 1, wherein the magnetic resonance imaging data comprise morphological magnetic resonance imaging data acquired using at least one magnetic resonance imaging pulse sequence, the at least one magnetic resonance imaging pulse sequence being at least one of
    a T2-weighted half-Fourier acquisition Single-shot Turbo Spin Echo imaging (HASTE) pulse sequence, a T2-weighted BLADE pulse sequence, a T2-weighted Turbo Spin Echo (TSE) pulse sequence, a T1-weighted Gradient Echo pulse sequence, a True fast imaging with steady-state free precision (FISP) pulse sequence, a pulse sequence measuring a free-induction-decay (FID), a radial Volumetric Interpolated Breath-hold Examination (VIBE) pulse sequence, a spiral VIBE pulse sequence, a Gradient and Spin Echo (GRASE) pulse sequence, or a radial TSE pulse sequence.

25. The computer-implemented method of claim 24, wherein the magnetic resonance imaging data comprise a combination of the morphological magnetic resonance imaging data and functional magnetic resonance imaging data, the functional magnetic resonance imaging data including at least one of a lung ventilation map or a lung perfusion map.

26. The computer-implemented method of claim 1, wherein the magnetic resonance imaging data comprise functional magnetic resonance imaging data, the functional magnetic resonance imaging data including at least one of a lung ventilation map or a lung perfusion map.

27. The computer-implemented method of claim 26, wherein the functional magnetic resonance imaging data is acquired based on a Fourier decomposition approach applied on a time series of dynamic magnetic resonance data.

28. The computer-implemented method of claim 1, wherein the magnetic resonance imaging data comprise magnetic resonance fingerprinting data acquired using a magnetic resonance fingerprinting technique.

29. The computer-implemented method of claim 28, wherein the magnetic resonance fingerprinting data comprise at least two spatially-resolved maps, the at least two spatially-resolved maps including at least one of a T1 map, a T2 map or a proton density (PD)-map.

30. The computer-implemented method of claim 1, wherein the output data comprise a classification if the patient is afflicted with COVID-19, at least one different infectious respiratory disease or if the patient is healthy.

31. The computer-implemented method of claim 30, wherein the at least one different respiratory disease comprises at least one of pneumonia, middle east respiratory syndrome (MERS), or severe acute respiratory syndrome (SARS).

32. The computer-implemented method of claim 1, wherein the output data comprise spatially-resolved localization data indicating the affliction of the patient with the infectious respiratory disease.

33. The computer-implemented method of claim 32, wherein the localization data comprise an indication at which location in the magnetic resonance imaging data an abnormality is present.

34. The computer-implemented method of claim 32, wherein the localization data comprise a segmentation of at least one region in the magnetic resonance imaging data in which an abnormality is present.

35. The computer-implemented method of claim 32, wherein the localization data comprise a spatially-resolved indication regarding a severity of the affliction of the patient with the infectious respiratory disease at corresponding spatial locations.

36. The computer-implemented method of claim 32, wherein the providing the output data comprises:

displaying the localization data as an overlay over the magnetic resonance imaging data at corresponding spatial locations.

37. The computer-implemented method of claim 1, wherein the magnetic resonance imaging data form a part of input data which the trained function is applied to generate the output data, wherein the input data additionally comprise further magnetic resonance imaging data comprising at least one further organ region of the patient.

38. The computer-implemented method of claim 37, wherein the at least one further organ region comprises at least one body region, the at least one body region including at least one of a brain region of the patient, a vascular region of the patient, or a heart of the patient.

39. A providing system for providing output data comprising an indication regarding an affliction of a patient with an infectious respiratory disease, the system comprising:
   at least one memory; and
   processing circuitry configured to, with the at least one memory, cause the providing system to
      receive magnetic resonance imaging data acquired using exclusively a single T2-weighted or PD weighted imaging sequence via a magnetic resonance imaging system, the magnetic resonance imaging data comprising a lung region of the patient,
      apply a trained function to the magnetic resonance imaging data to generate output data, the trained function being based on an artificial neural network and the output data comprising the indication regarding the affliction of the patient with the infectious respiratory disease, and
      provide the output data.

40. A providing system for providing output data comprising an indication regarding an affliction of a patient with an infectious respiratory disease, the system comprising:
   at least one memory; and
   processing circuitry configured to, with the at least one memory, cause the providing system to
      receive magnetic resonance imaging data acquired using exclusively a single spiral or 3D radial Ultra-short echo-time pulse sequence via a magnetic resonance imaging system, the magnetic resonance imaging data comprising a lung region of the patient,
      apply a trained function to the magnetic resonance imaging data to generate output data, the trained function being based on an artificial neural network and the output data comprising the indication regarding the affliction of the patient with the infectious respiratory disease, and
      provide the output data.

41. A providing system for providing output data comprising an indication regarding an affliction of a patient with an infectious respiratory disease, the system comprising:
   at least one memory; and
   processing circuitry configured to, with the at least one memory, cause the providing system to
      receive magnetic resonance imaging data acquired using a magnetic resonance imaging system, the magnetic resonance imaging data comprising a lung region of the patient,
      apply a trained function to the magnetic resonance imaging data to generate output data, the trained function being based on an artificial neural network and the output data comprising
         the indication regarding the affliction of the patient with the infectious respiratory disease, and
         a classification if the patient afflicted with (coronavirus disease 2019) is in an acute COVID-19 stage or has already recovered from COVID-19, and
      provide the output data.

42. A providing system for providing output data comprising an indication regarding an affliction of a patient with an infectious respiratory disease, the system comprising:
   at least one memory; and
   processing circuitry configured to, with the at least one memory, cause the providing system to
      receive magnetic resonance imaging data acquired using a magnetic resonance imaging system, the magnetic resonance imaging data comprising a lung region of the patient,
      receiving temperature mapping data of the patient acquired with the magnetic resonance imaging system,
      apply a trained function to input data including the magnetic resonance imaging data and the temperature mapping data to generate output data, the trained function being based on an artificial neural network and the output data comprising the indication regarding the affliction of the patient with the infectious respiratory disease, and
      provide the output data.

* * * * *